May 26, 1925.

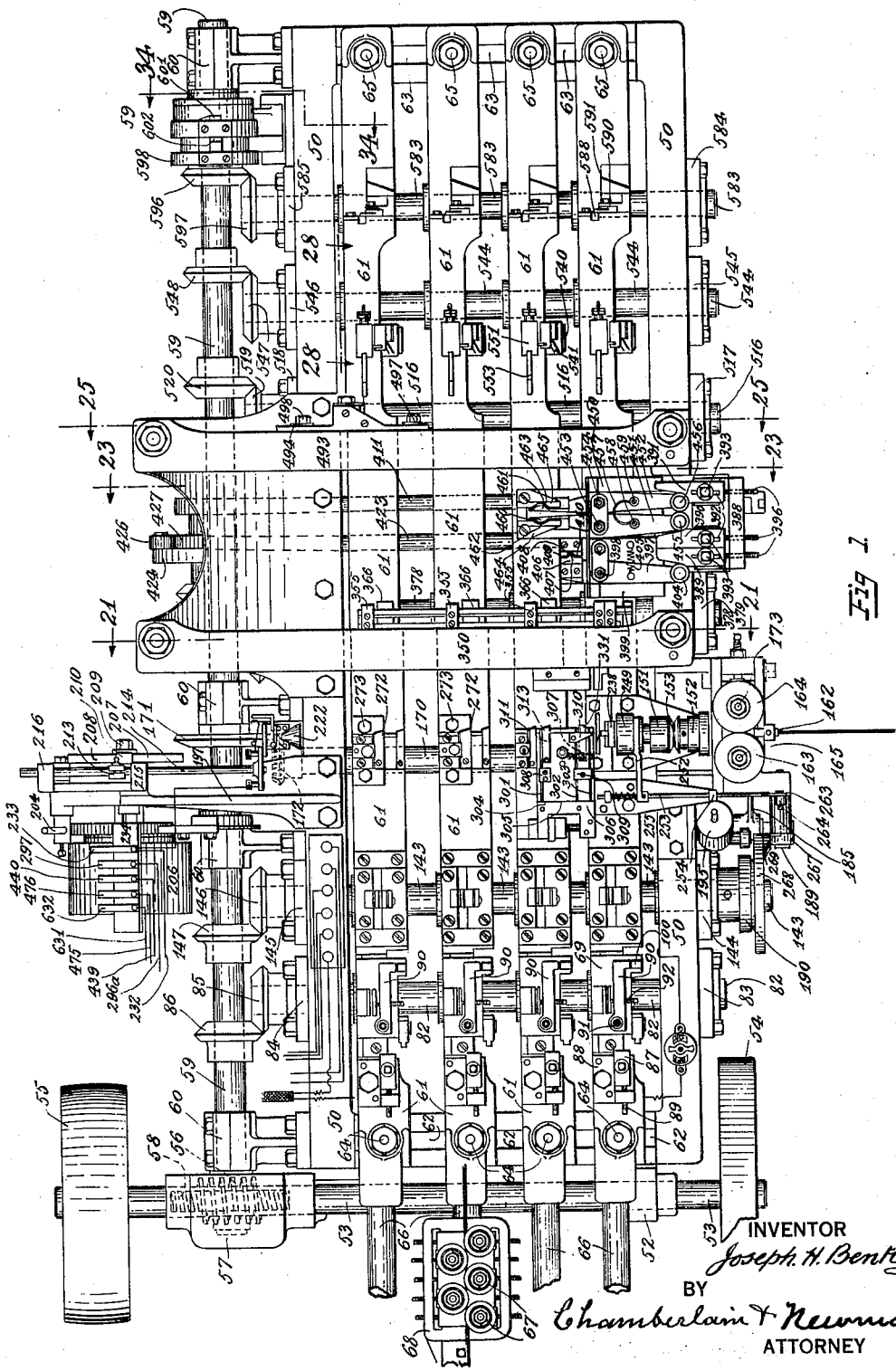

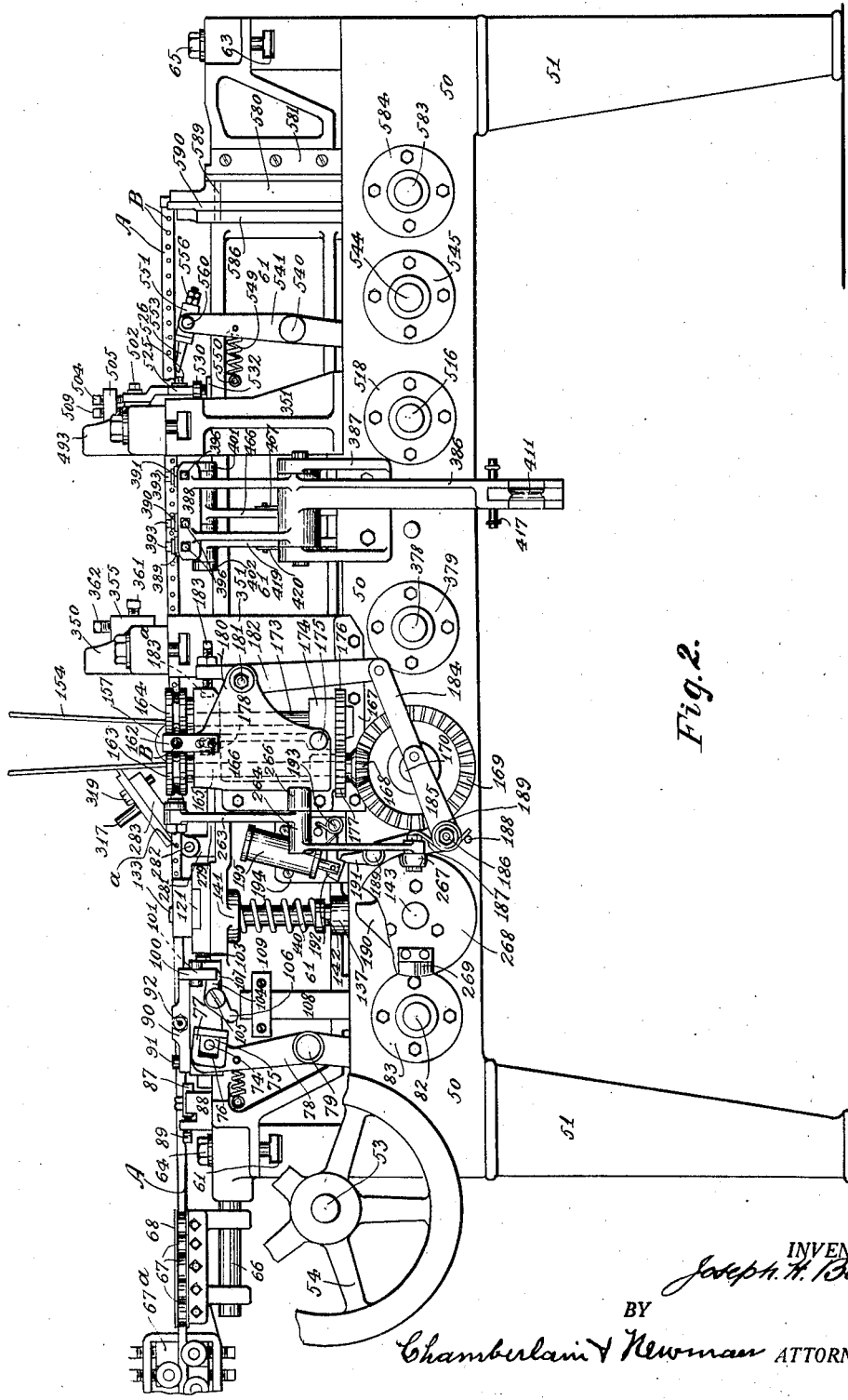

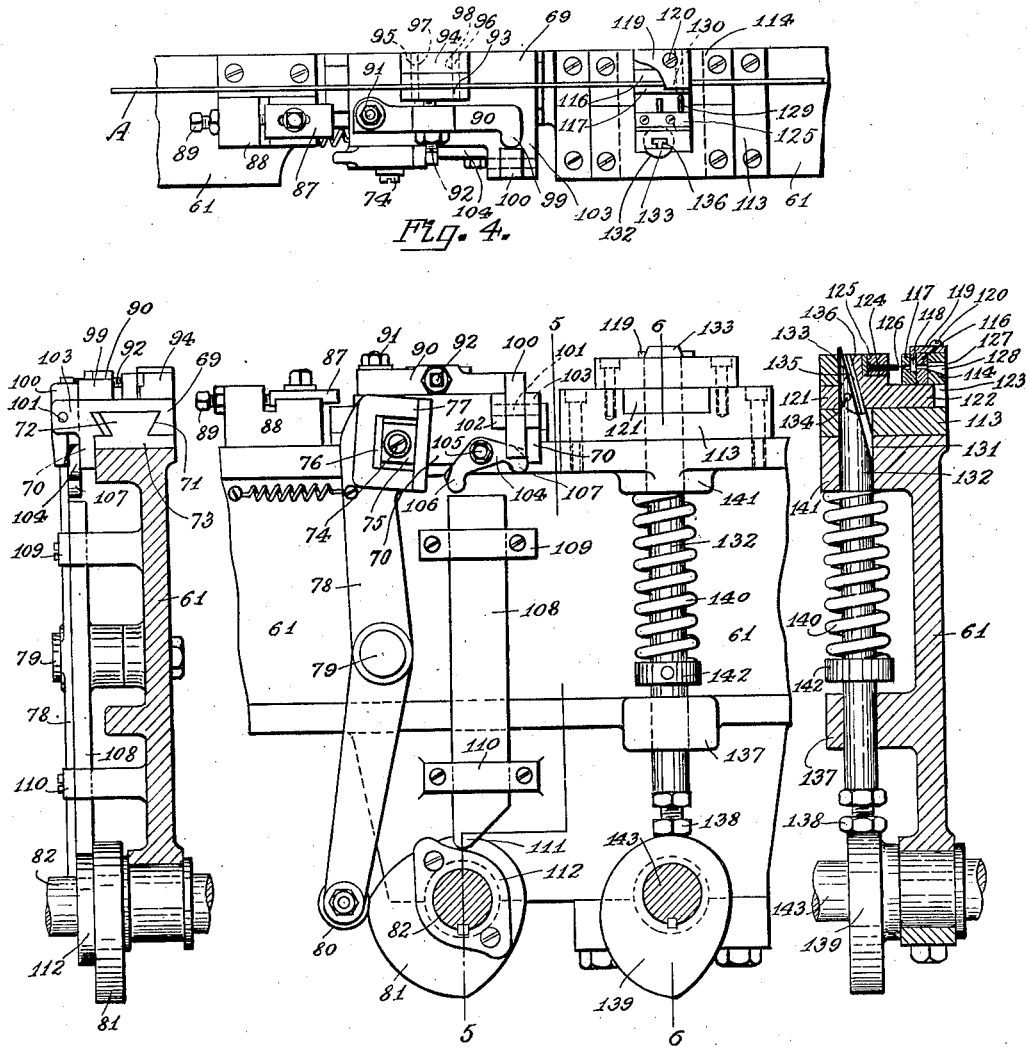

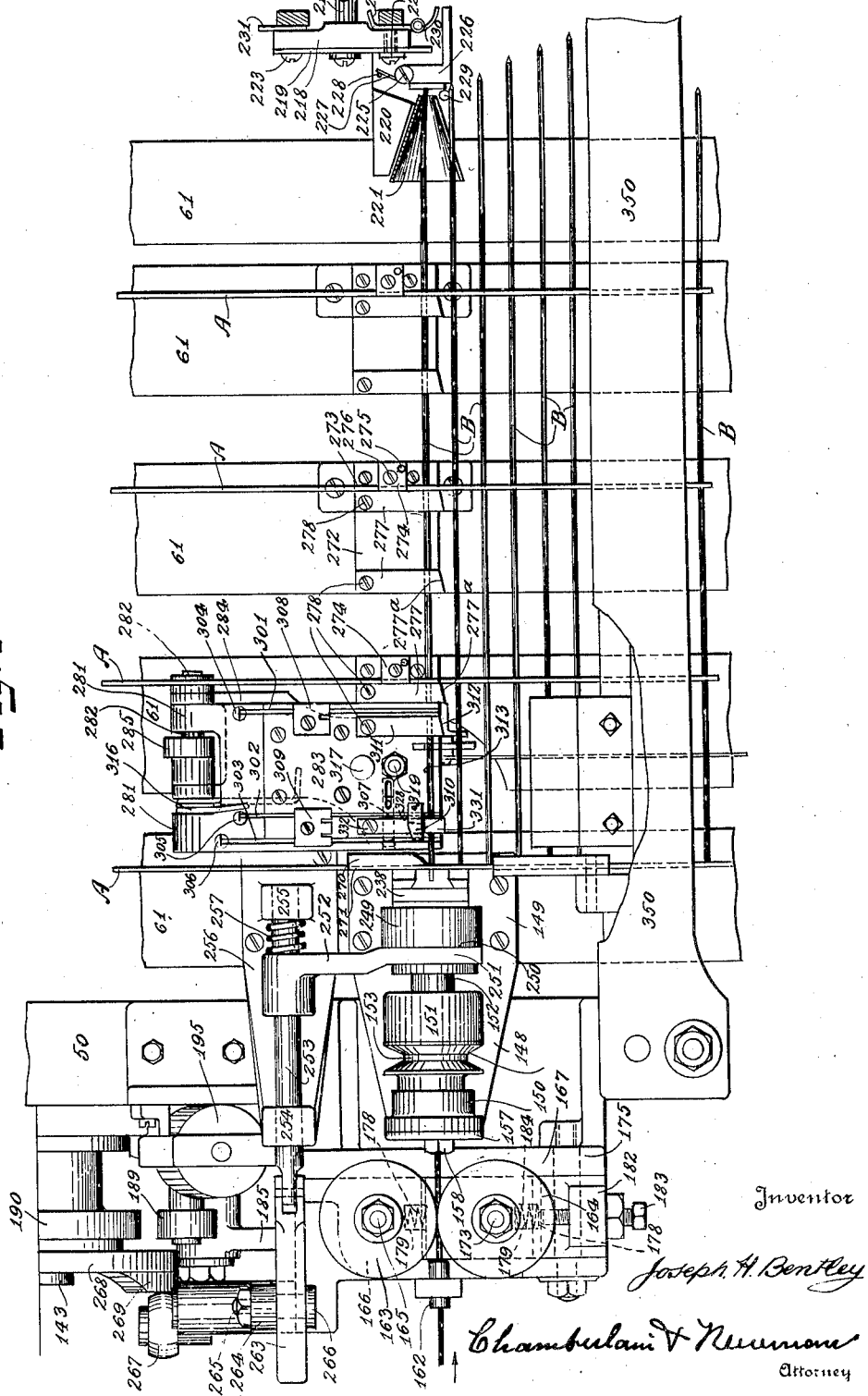

J. H. BENTLEY 1,538,883

BIRD CAGE FORMING MACHINE

Filed Feb. 16, 1923      13 Sheets-Sheet 5

INVENTOR.
Joseph H. Bentley.
Chamberlain & Newman
ATTORNEYS.

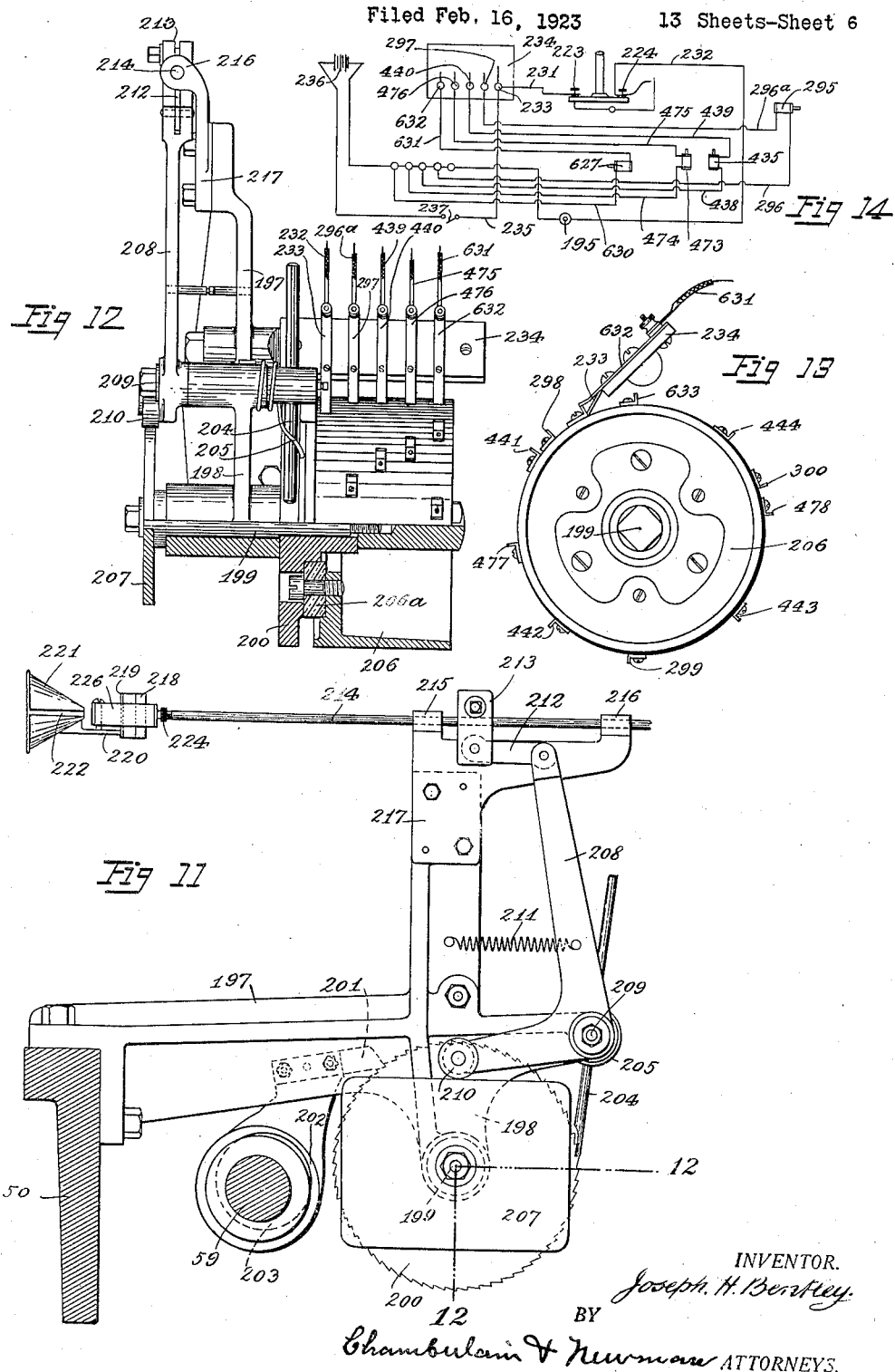

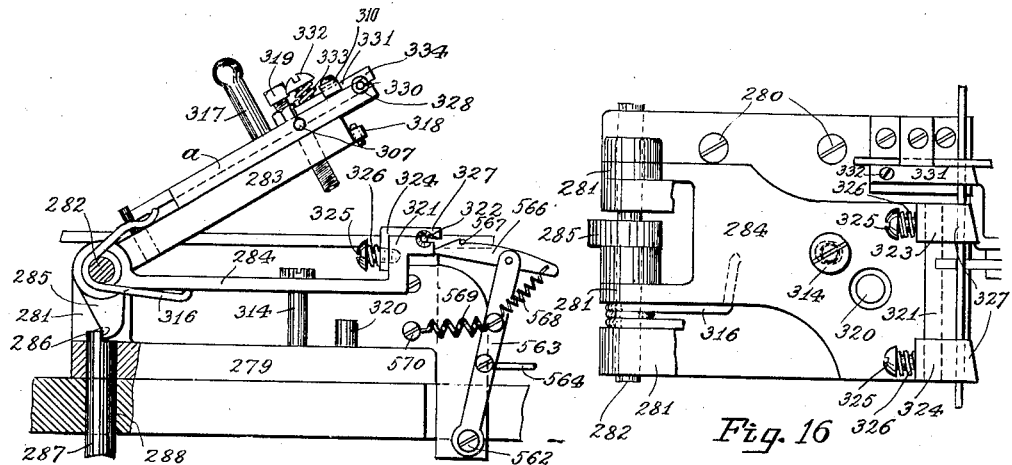
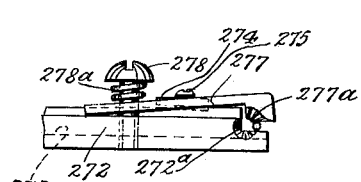
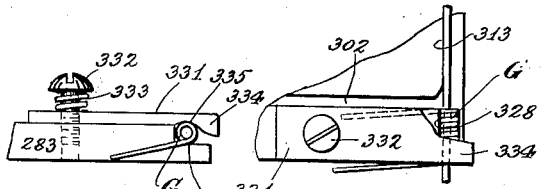
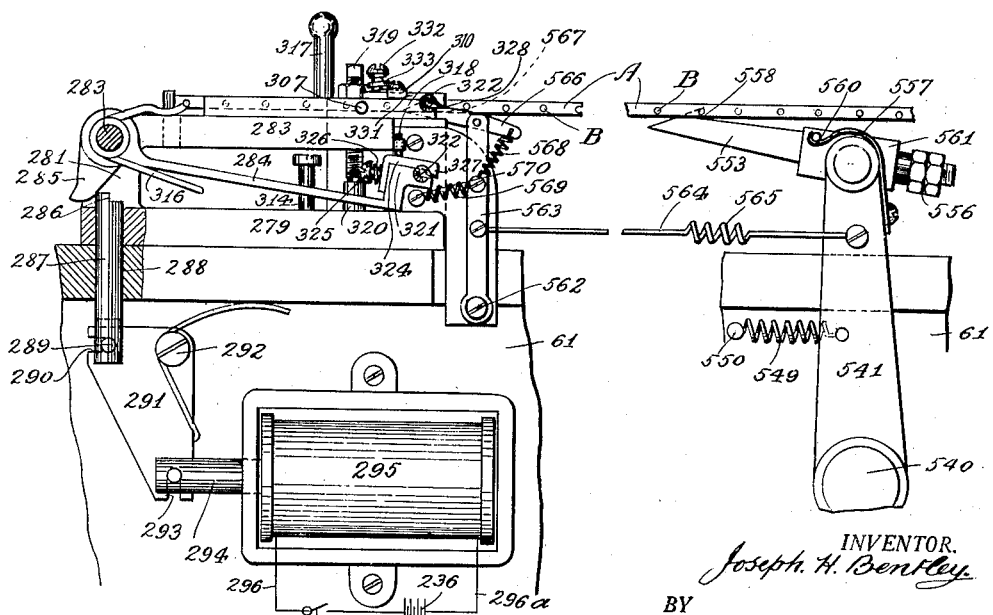

May 26, 1925. 1,538,883
J. H. BENTLEY
BIRD CAGE FORMING MACHINE
Filed Feb. 16, 1923    13 Sheets-Sheet 8
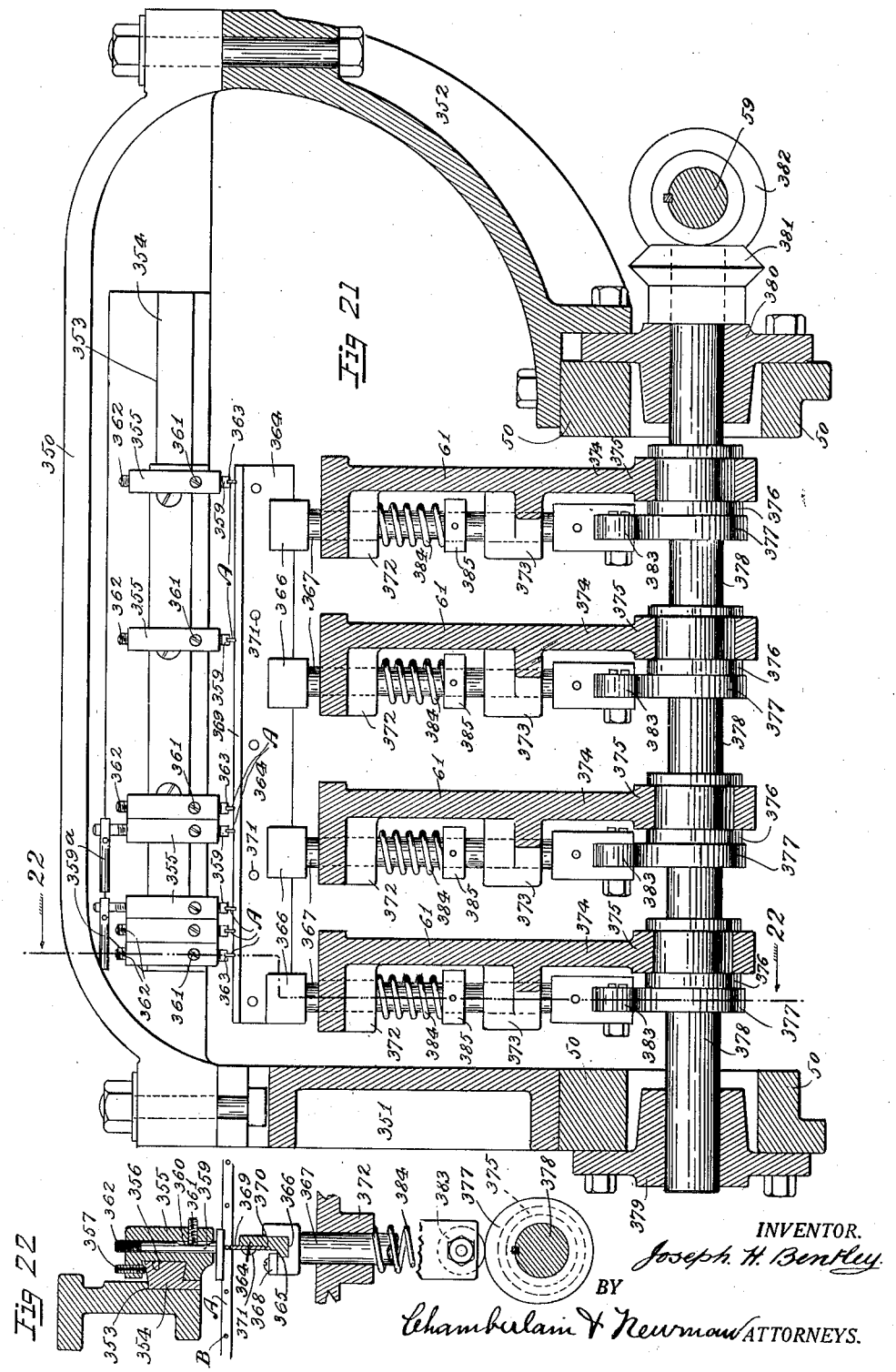
INVENTOR.
Joseph H. Bentley
BY
Chamberlain & Newman ATTORNEYS.

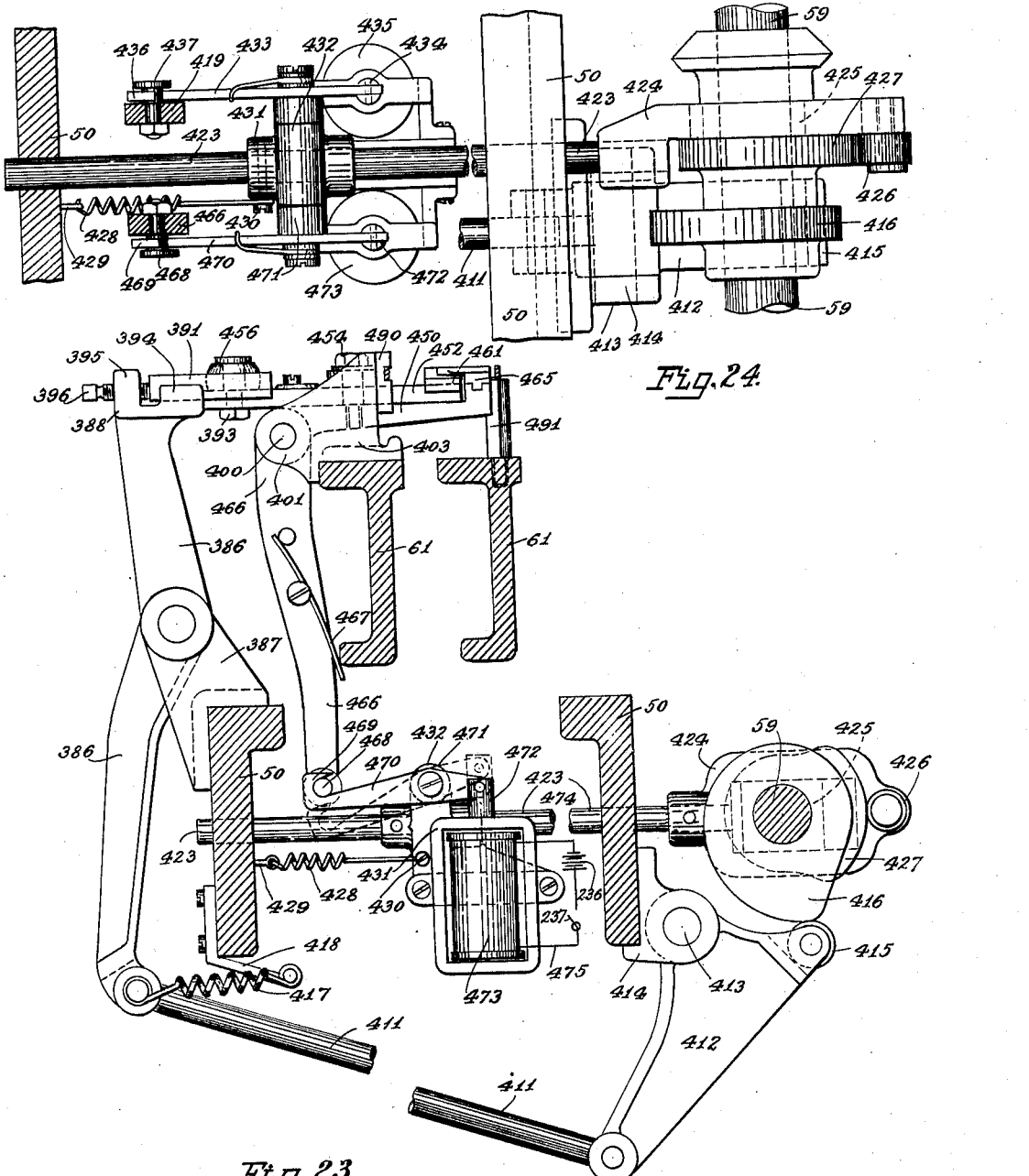

May 26, 1925. 1,538,883
J. H. BENTLEY
BIRD CAGE FORMING MACHINE
Filed Feb. 16, 1923 13 Sheets-Sheet 10
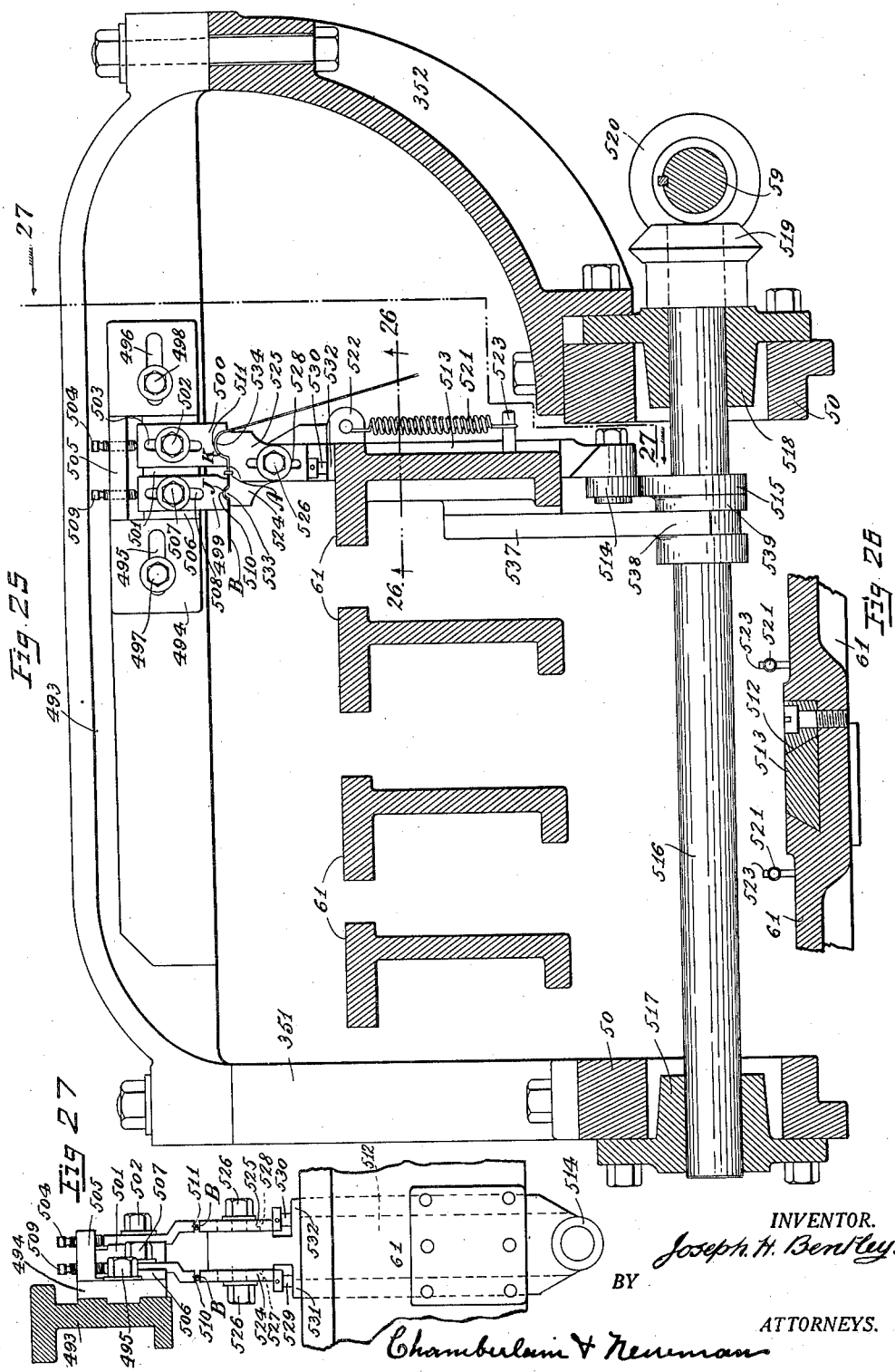
INVENTOR.
Joseph H. Bentley.
BY
Chamberlain & Newman
ATTORNEYS.

May 26, 1925.
J. H. BENTLEY
BIRD CAGE FORMING MACHINE
Filed Feb. 16, 1923 13 Sheets-Sheet 11
1,538,883
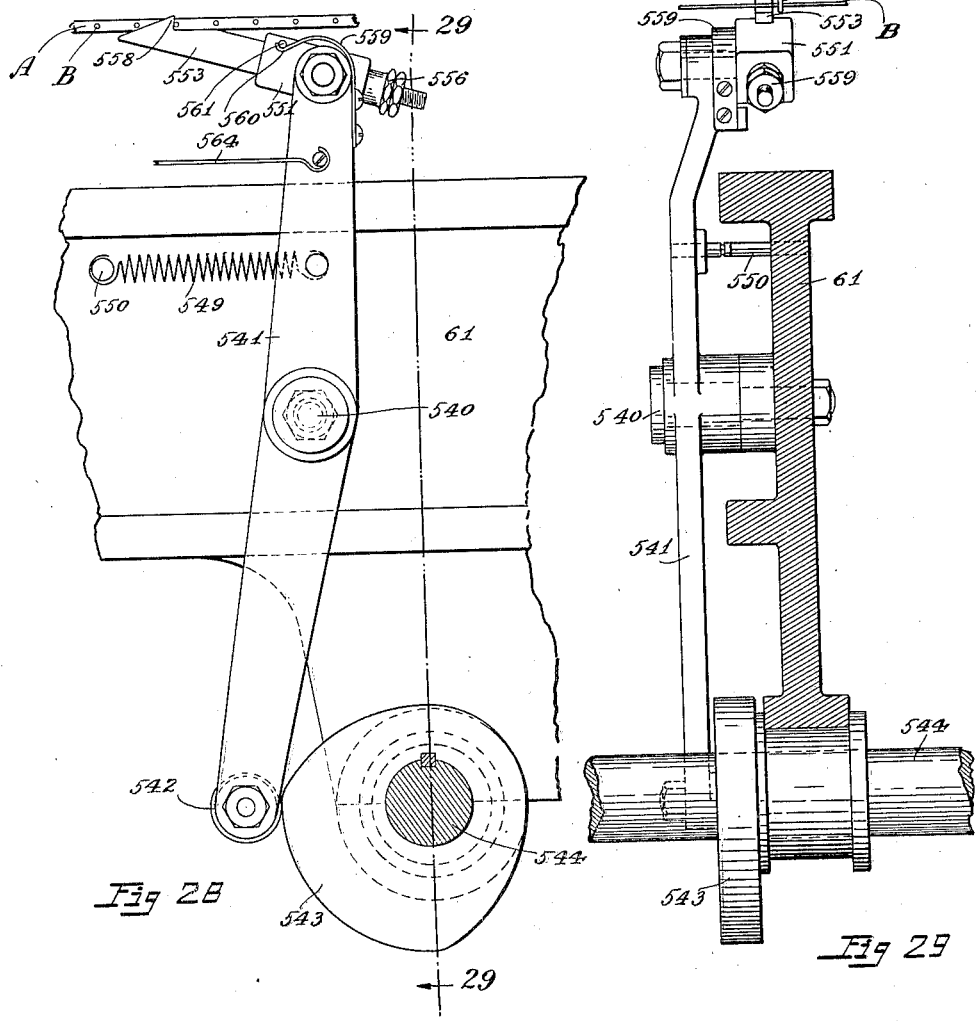
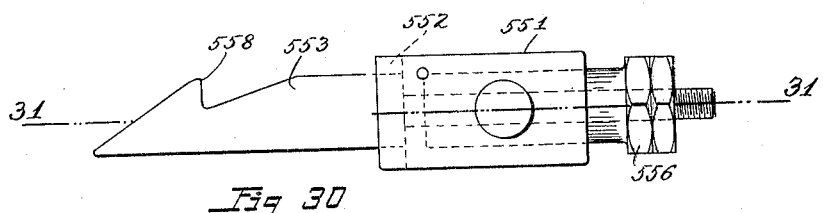
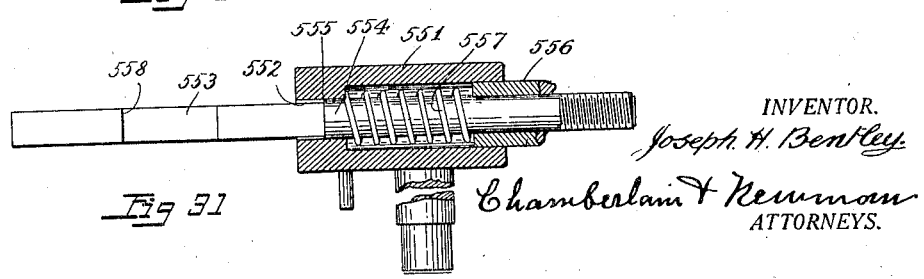
INVENTOR.
Joseph H. Bentley
Chamberlain + Newman
ATTORNEYS.

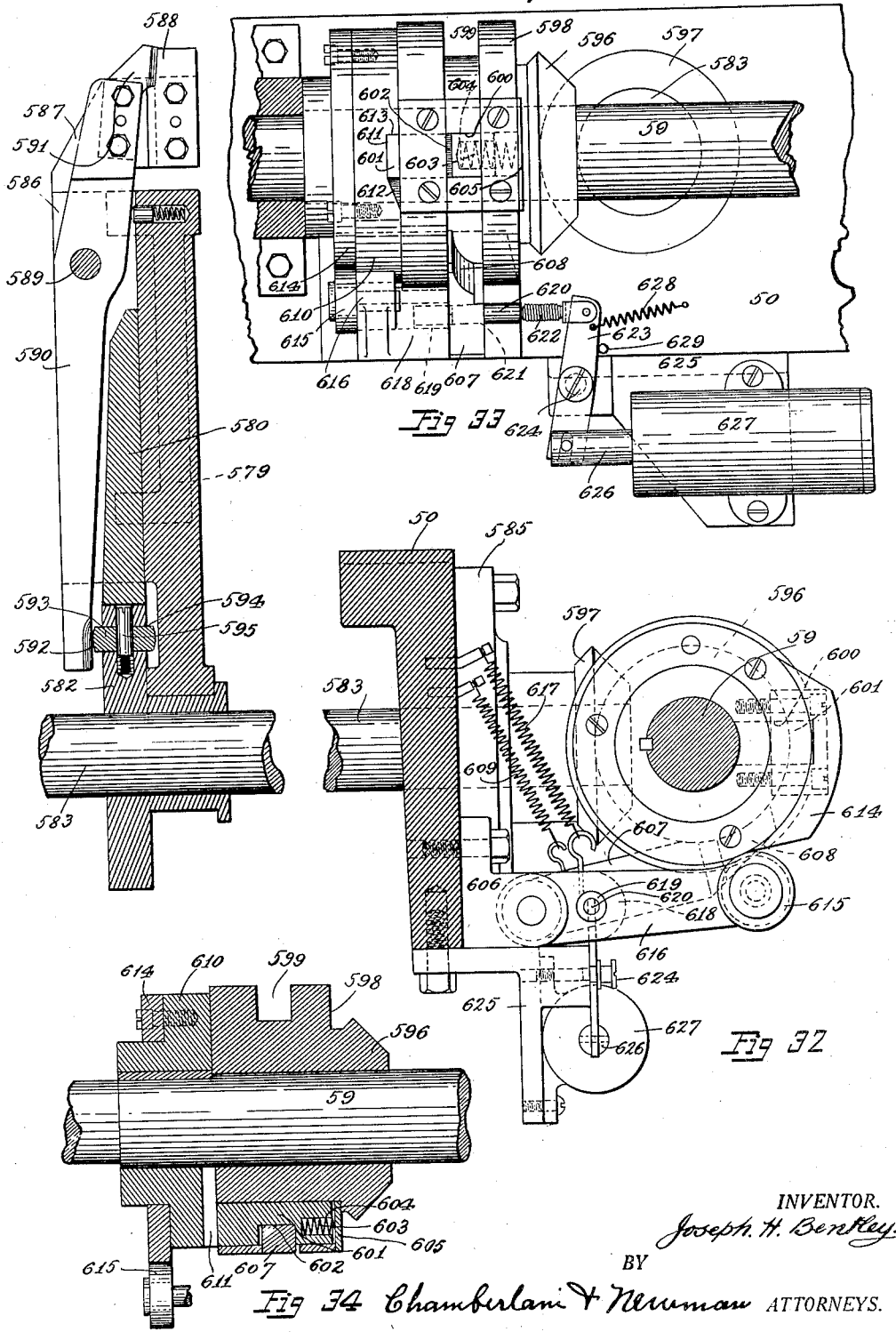

May 26, 1925. 1,538,883
J. H. BENTLEY
BIRD CAGE FORMING MACHINE
Filed Feb. 16, 1923   13 Sheets-Sheet 13

Inventor
Joseph H. Bentley

By Chamberlain & Newman
Attorney

Patented May 26, 1925.

1,538,883

UNITED STATES PATENT OFFICE.

JOSEPH H. BENTLEY, OF BRIDGEPORT, CONNECTICUT, ASSIGNOR TO O. LINDEMANN & CO., OF NEW YORK, N. Y., A FIRM COMPOSED OF OTTO LINDEMANN, OSCAR LINDEMANN, AND HENRY O. LINDEMANN.

BIRD-CAGE-FORMING MACHINE.

Application filed February 16, 1923. Serial No. 619,351.

*To all whom it may concern:*

Be it known that JOSEPH H. BENTLEY, a citizen of the United States, and resident of Bridgeport, in the county of Fairfield and State of Connecticut, has invented certain new and useful Improvements in Bird-Cage-Forming Machines, of which the following is a specification.

The present invention relates to a machine for assembling and forming wire structures, and particularly such a machine for assembling and forming parallel spaced wires or the like and supporting bars at right angles thereto into a cage-like structure.

The present embodiment of the invention is especially designed for forming wire bird cages, and will be described with reference to the manufacture of such cages, although it will be understood that the principle of the invention may be utilized and the machine adapted for manufacturing other substantially similar structures.

An object of the invention is to provide a machine in which the various operations of forming a cage structure—that is, assembling of the wires and supporting bars, the provision of a door, the imparting of special shapes to the wires as required for forming eaves, cup bends, perch supports, etc.—may be performed automatically and continuously, to the end that the product of the machine will be a complete cage unit adapted with certain finishing operations to form a finished cage.

A further object is to provide a machine adapted by adjustment and regulation to the manufacture of cages of various shapes, as for instance rectangular, square, or round cages; and of different sizes and widths; and having two or more spaced horizontal supporting bars and vertical wires of any desired gauge, spacing and length. It will be understood that in round cages the vertical wires which are bent at the eave to a common center to form a top will be of uniform length, while in square or rectangular cages they will be of varying lengths. It is an object of the invention therefore to provide automatic means by which these wires may be formed of any desired predetermined length.

Another object is to enable the vertical wires to be supplied from a single coil of wire and the horizontal bars to be supplied from a corresponding number of coils of bar material, the bars being automatically perforated in the machine so that the vertical wires may be threaded therethrough.

It is also an object to provide such a machine which will be of relatively simple construction, may be operated by one attendant, and in which all of the various operations may be accurately controlled and regulated.

With the above and other objects in view embodiments of my invention are shown in the accompanying drawings and these embodiments will be hereinafter more fully described with reference thereto, and the invention finally pointed out in the claims.

In the drawings:

Fig. 1 is a plan view of the wire assembling and forming machine according to the present embodiment of the invention;

Fig. 2 is a side elevation thereof;

Fig. 3 is an enlarged side elevation of the bar feeding and perforating mechanisms;

Fig. 4 is a plan view of the bar feeding and perforating mechanisms upon one of the tool rails;

Fig. 5 is a vertical sectional view taken along the line 5—5 of Fig. 3;

Fig. 6 is a vertical sectional view taken along the line 6—6 of Fig. 4;

Fig. 7 is an enlarged plan view of that part of the machine including the wire threading and cutting off mechanism, and the door and cup supporting bar inserting mechanism;

Fig. 11 is a sectional elevation of the wire feed stopping mechanism;

Fig. 12 is an end view thereof, partly in vertical section along the line 12—12 of Fig. 11;

Fig. 13 is an end view of the electrical control brushes and contact drum;

Fig 14 is a diagrammatic plan view of the wiring of the electrical control means;

Fig. 15 is an enlarged detail side elevation of the door and cup supporting bar inserting mechanism, and showing the same in raised or inoperative position;

Fig. 16 is a plan view of the lower portion of the same, the door and cup supporting bar inserting gate being removed;

Fig. 17 is a side elevation of this mechanism, showing the same in its lowered or operative position, and also showing the auxiliary feed mechanism for drawing the cage structure through the machine;

Fig. 18 is an enlarged detail side view of the wire guides and showing the same opened by the feeding of the vertical cage wire therefrom;

Fig. 19 is an enlarged detail side view of the door spring holder showing a spring inserted therein;

Fig. 20 is a plan view thereof, with the spring inserted, and partially broken away;

Fig. 21 is a vertical section and elevation of the wire clinching mechanism, being taken along the line 21—21 of Fig. 1;

Fig. 22 is a vertical sectional view taken along the line 22—22 of Fig. 21;

Fig. 23 is a vertical section and elevation of the perch support and cup bend forming mechanisms, being taken along the line 23—23 of Fig. 1;

Fig. 24 is a plan view of the lower portion of the mechanism of Fig. 23;

Fig. 25 is a vertical section and elevation of the eave and top forming mechanism, being taken along the line 25—25 of Fig. 1;

Fig. 26 is a horizontal sectional view along the line 26—26 of Fig. 25;

Fig. 27 is an end elevation of the mechanism, taken along the line 27—27 of Fig. 25;

Fig. 28 is a vertical section and elevation of the auxiliary feeding mechanism for drawing the cage structure through the machine, being taken along the line 28—28 of Fig. 1;

Fig. 29 is a vertical sectional view taken along the line 29—29 of Fig. 28;

Fig. 30 is an enlarged detail view of the feeding device for engaging the vertical wires;

Fig. 31 is a horizontal sectional view thereof, taken along the line 31—31 of Fig. 30;

Fig. 32 is a view partially in elevation and partially in vertical section of a cutting off mechanism for severing the completed cage unit being taken along line 34—34 of Fig. 1 and being partly broken away;

Fig. 33 is a plan view of the automatic clutch mechanism shown at the right of Fig. 32 and adapted to operate the cutting off mechanism;

Fig. 34 is a vertical sectional view through the clutch mechanism and showing the same moved to a position substantially ninety degrees removed from the position shown in Fig. 32 and with the parts inoperative to actuate the cutting off mechanism;

Similar reference characters indicate corresponding parts throughout the several figures of the drawings.

Figure 9:
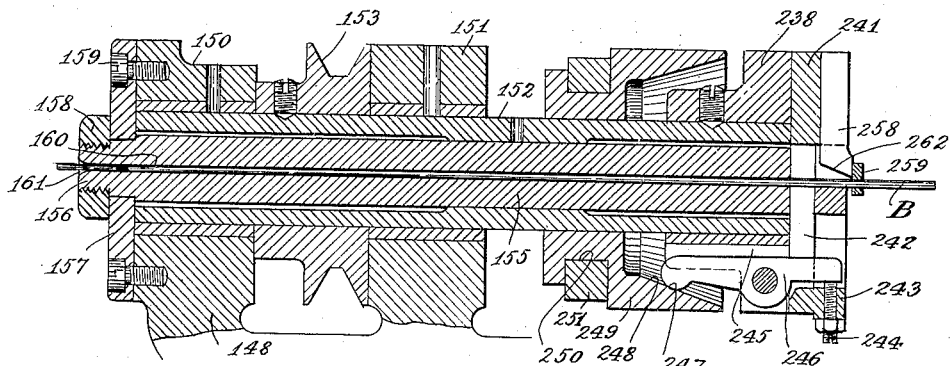
Fig. 9 is a vertical sectional view of the wire threading guide and cut-off mechanism.
Figure 10:
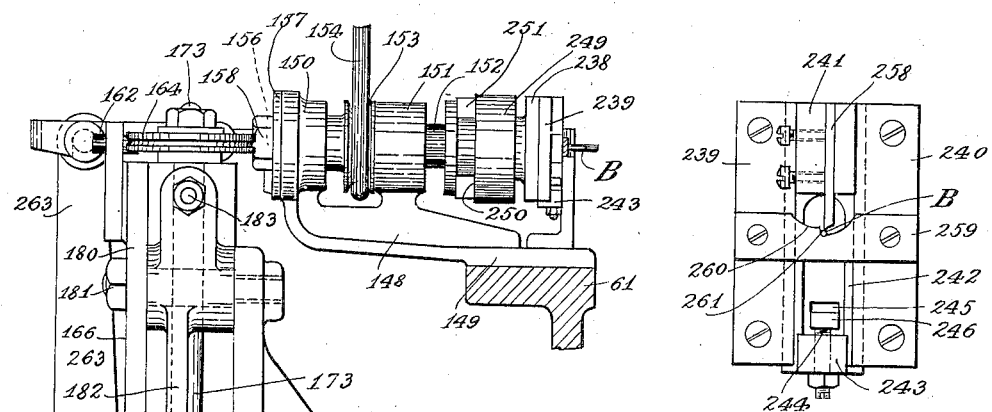
Fig. 10 is a front end view of the wire cut-off mechanism.
Figure 8:
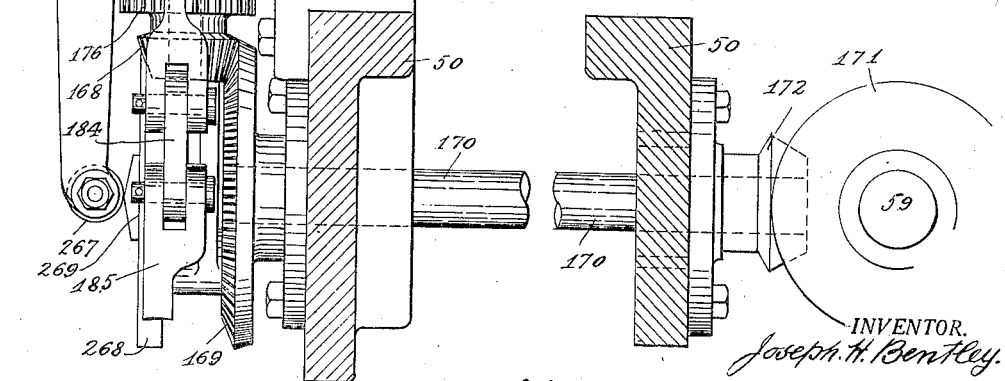
Fig. 8 is a cross sectional elevation of the wire threading mechanism, the main frame only of the machine being shown in vertical section.

Referring particularly to Figs. 1 and 2 of the drawings, the machine comprises a supporting frame or bed 50 of rectangular form provided at its corners with supporting standards 51. At one end of the frame 50 there is journalled in bearing brackets 52 a main drive shaft 53 provided at one end with a fly wheel 54 and at its other end with a pulley 55 over which a drive belt (not shown) extends. The shaft 53 carries a worm 56 enclosed beneath a protective shield or cover 57 and meshes with a worm gear 58 provided on the end of a longitudinally disposed counter shaft 59 journalled at the rear of the frame in a plurality of brackets 60.

It should be here stated that a plurality of spaced parallel horizontal bars A are adapted to be fed longitudinally of the machine, perforated at predetermined points A, and to thereupon have vertical wires inserted through the perforations, subsequent operations consisting in clinching the bars to prevent shifting of the wires, B and the imparting of special shapes to the wires to form cup bends, perch supports, etc. The feeding mechanisms for the several horizontal bars are arranged in parallel relation in the machine, are of identical construction and operate simultaneously so that only one of these feeding mechansims will be described in detail.

The ends of the frame form seats for the ends of the elongated tool rails 61 which may be formed of one or more parts suitably bolted together and which mounts the various devices and mechanisms adapted to feed and operate upon the bar. The rails extend the length of the machine, their ends resting upon the transverse end portions of the frame 50 which are provided with slots 62 and 63 respectively through which securing bolts 64 and 65 extend, this construction permitting the tool rails to be shifted transversely of the frame to space the bar feeding mechanisms as desired. Fig. 1 shows four such mechanisms but it will be understood that one or more of these may be removed by simply disengaging the bolts 64 and 65 and lifting out the rail. The several tool rails may then be spaced as required for the particular type of cage being formed.

At the feeding end of the rail 61 there is provided a bar 66 upon which a bar straightening mechanism is mounted, this mechanism consisting of a set of rollers 67 adjustably mounted in a frame 68 to rotate in a parallel plane, and another set of rollers 67ª disposed at right angles thereto to rotate in a vertical plane. This mechanism is of well known construction and no further illustration or description is deemed necessary. For the sake of clearness only one set of rollers is shown upon the end of one of the bars 66.

The bar material is fed between the rollers from a coil (not shown) and passes from the rollers through an intermittently operating feed mechanism, adapted to intermittently feed the bar forwardly through the machine a predetermined distance corresponding to the spacing of the vertical wires of the cage structure.

The bar feeding mechanism (Figs. 1 and 3 to 5) consists of a reciprocating slide 69 having a flange 70 formed thereon and extending downwardly at the forward side of the tool rail. A channel 71 is provided in the under side of the slide and is engaged by an under cut rib 72 formed upon a slide block 73 secured to the tool rail. A stud 74 is provided upon the flange 70 and carries a pivotal block 75 slidably engaging a rectangular opening 76 provided in the cross head 77 at the upper end of a lever 78 pivotally mounted intermediate its ends upon a stud shaft 79 secured to the side of the tool rail, and provided at its lower end with a roller 80. The roller 80 rides upon a cam 81 mounted upon a transversely disposed shaft 82 journalled in bearings 83 and 84 at the under side of the longitudinal side portions of the frame 50 and extending below the tool rails, this shaft being provided at its rear end with a bevel gear 85 meshed by a bevel gear 86 carried upon the counter or back drive shaft 59. It will be understood as before pointed out that a plurality of these cams 81 are provided in spaced relation upon the shaft 82 and are adapted to respectively operate the corresponding feed mechanisms of the several tool rails. The cam is designed to oscillate the lever 78 in a manner to move the slide to and fro upon the slide block. An adjustable stop 87 is mounted upon a bracket 88 secured to the rail rearwardly of the slide, and is adapted to be adjustably fixed in position by means of a set screw 89. This stop is arranged to limit the return stroke of the slide to the length of feeding movement it is desired to impart to the bar.

Upon the upper side of the slide there is provided a lever 90 pivoted at 91 for movement in a horizontal plane and provided intermediate its ends with an adjustable contact screw 92 adapted to bear at its inner end upon a vertically arranged gripping block 93 disposed in opposed relation to a stationary gripping block 94 secured to the slide and between which gripping blocks the bar is fed. Guide pins 95 and 96 are provided on the block 93 and slidably engage in passages 97 and 98 formed therefor in the stationary block 94. By means of mechanism presently to be described the lever 90 is pressed inwardly during the forward stroke of the slide to press the block 93 into gripping engagement with the bar extending between it and the gripping block 94 so that during the forward stroke of the slide the bar is fed forwardly a predetermined distance. Upon the return stroke, however, the pressure is released so that the gripping blocks move free of the bar. At its forward end the lever 90 is bent outwardly as at 99 and is adapted to be engaged at the upper end by a rocker lever 100 pivotally mounted upon a pintle 101 mounted in lugs 102 and 103 formed at the forward side of the slide. The lower end of the rocker lever is shaped to provide a space between it and the side of the slide into which a locking wedge member 104 is adapted to be intermittently inserted and removed to thereby apply and relieve pressure upon the rocking lever 100. This locking wedge member is pivotally mounted at 105 upon the slide and is provided at its ends with downwardly projected lugs or lobes 106 and 107 and which are adapted to be respectively engaged at the ends of the forward and return strokes of the slide by a vertically reciprocating bar 108, the lug 106 being engaged at the end of the forward stroke to disengage the wedge locking member from the rocker lever 100, and the lug 107 being engaged at the end of the return stroke to engage the wedge locking member with the rocker lever 100. In order to insure the entrance of the wedge member behind the lever 100 the contacting corners of these two parts are beveled, as shown. The bar 108 is guided in brackets 109 and 110 secured to the side of the tool rail, and at its lower end is provided with a round nose 111 riding upon a cam 112 provided upon the shaft 82. This cam has two diametrically disposed rises, so that during the single cycle the bar 108 is reciprocated upwardly twice to cause the gripping mechanism to grip and release the bar as before pointed out.

The bar is now fed through perforating mechanism to provide the spaced perforations therein through which the vertical wires are later threaded. A block 113 is secured to the tool rail and is provided at its rear and upon the upper surface thereof with a block 114 provided at its forward side with a stationary die 116, a stripper plate 117 being provided forwardly of the die and recessed as at 118 to provide a guide passage through which the bar is fed.

A flanged plate 119 is secured at the upper side of the block 114 by a screw 120, the flange at the forward edge of the plate being bent downwardly into the recess or passage 118 to engage the upper edge of the bar to retain it therein.

A punch slide 121 is slidably mounted upon the block 113, and is provided with a guide portion 122 engaging a passage 123 in the plate 117 to accurately guide the transverse movement of the slide. The slide carries a punch 124 secured by means of a mounting block 125, and adapted upon the forward stroke of the slide to engage a passage 126 in the plate 117 which functions as a stripper, and to engage a passage 127 in the die 116 to thereby perforate the bar, the material removed by this perforating operation falling out through an opening 128 provided in the portion 114.

The slide 122 also carries a pin 129 which reciprocates through a guide passage 130 in the portion 117.

The rear wall of the slide 122 is disposed at the upper end of a vertical passage 131 formed through block 113 and the upper portion of the tool rail and through which reciprocates the upper end of a bar 132. This bar is provided with a beveled end portion 133 upon which there is pivotally mounted at 134 a T-shaped key 135, which slidably engages a T-shaped slot 136 provided in the rear beveled wall of the slide 122. In operation the upward movement of the bar 132 will impart a forward piercing motion to the punch slide, while the downward movement of the bar withdraws the punch slide. The lower portion of the bar 132 is guided in a bracket 137 formed upon the side of the tool rail and at its lower end is provided with an adjustable contact screw 138 riding upon a cam 139, and held in contact therewith by means of a spring 140, disposed between the upper bearing portion 141 of the tool rail through which the bar 132 reciprocates, and a collar 142 secured to the bar. The cam 139 is mounted on a transversely disposed shaft 143 journalled in bearings 144 and 145 secured to the under sides of the side portions of the frame 50, and provided at its rear end with a beveled gear 146 engaged by a beveled gear 147 provided upon the counter shaft 59. The cam 139 is designed to impart a single reciprocatory movement to the bar 132 during one cycle of operation of the machine so that the bar is perforated once for every cycle.

The horizontal supporting bars now pass to the wire threading mechanism (Figs. 7 to 10) and by means of which the vertical wires are threaded through the perforations of the several bars, these perforations being in exact alignment. Automatic control mechanism is provided for determining the lengths of the individual wires which as before stated vary in the formation of a rectangular cage unit. Prior to the threading of the wires, however, and at a certain period during the production of a single cage unit, a number of horizontal bars are adapted to be inserted for the purpose of forming the door structure; and in order to accurately position this door structure with relation to the completed unit the automatic control mechanism is also adapted to cause the door forming device to function at a predetermined point during the formation of a single cage unit; and also the mechanisms which do not operate during each cycle of operation of the machine but only at certain predetermined points, these mechanisms being the cup-bend forming mechanism, the perch-support forming mechanism and the cutting-off mechanism. Thus it will be seen that this automatic control mechanism operates all of the variable factors at their proper predetermined points with relation to the complete unit. Inasmuch as the wire feeding mechanism operates for a certain period before any of these other mechanisms function it will be first described although the door forming mechanism occupies a position in the machine previous thereto.

The wire threading mechanism is mounted upon the tool rail adjacent the front of the machine and comprises a bracket 148 having its base portion 149 secured to the tool rail, and provided with a forwardly projecting portion having a pair of spaced cylindrical bearings 150 and 151 formed thereon, the axis of these bearings being at right angles to the line of feed of the supporting bars and in exact alignment with the perforations through the bars. A rotary tubular spindle 152 is supported in the bearings 150 and 151, and has mounted thereon between the said bearings a grooved pulley 153, adapted to be continuously driven by means of a belt 154, which is driven from a source of power independent of the main driving mechanism of the machine. The rotary spindle is adapted, as will be presently more fully pointed out, to periodically operate a wire cutting-off mechanism mounted thereon.

Within the passage through the spindle 152 there is disposed a stationary wire guide 155 having its reduced front end 156 engaged with a disk 157 provided upon the face of the bearing 150 and secured to the said disk by means of a nut 158. The disk is held against rotation by means of set screws 159. A passage 160 is provided through the guide 155, the diameter of which is just sufficient to permit free feeding of the wire therethrough, said passage being flared at its entrance end as at 161 to guide the wire therein.

The wire is fed from a suitable source of supply as for instance a coil through a perforated pilot guide 162 between grooved feed rollers 163 and 164 through the guide, these rollers being continuously rotated and the roller 164 adapted to be intermittently moved into and out of gripping relation with the roller 163, so that when in such gripping relation the wire is fed and when moved out of such relation the feeding of the wire ceases. The roller 163 is mounted at the upper end of a vertical shaft 165, rotatably supported in a bracket 166 secured to a mounting boss 167 formed upon the forward side of the frame 50. At its lower end the shaft 165 is provided with a beveled pinion 168 meshing with a beveled gear 169 provided upon the front end of a cross shaft 170 journaled in suitable bearings in the frame 50 and driven from the counter-shaft 59 by means of a beveled gear 171 thereon meshing with a beveled pinion 172. This mechanism, it will be seen, continuously rotates the roller 163.

The roller 164 is mounted upon the upper end of a shaft 173, rotatably supported in a bearing support 174 pivotally mounted at its lower end upon a stud shaft 175 provided in the bracket 166. At the lower end of the shaft 173 there is provided a gear 176 which meshes with a corresponding gear 177 provided upon the shaft 165 of the roller 163, the meshing relation between these gears being such as to permit of a slight pivotal movement of the bearing 174 about its pivot 175 to move the roller 164 into gripping relation with the roller 163. The roller 164 is held out of gripping relation by means of a spring 178, disposed in a socket 179 in the upper end of the bearing 174 and bearing at one end upon a portion of the bracket 166.

Upon an extended portion 180 of the bracket 166 there is pivotally mounted at 181 a pressure lever 182, provided at its upper end with an adjustable contact screw 183, bearing upon a bearing block 183ª (Fig. 2) mounted at the upper end of the bearing member 174. The pressure lever is adapted upon inward movement of its upper end to bear upon the bearing member 174 in a manner to move the roller 164 into gripping relation with the roller 163 to feed the wire, outward movement of the upper end of the lever releasing the roller 164, which moves away from the roller 163 under the action of the spring 178. The lower end of the lever 182 is connected by means of a link 184 to one arm of a bell crank lever 185 pivotally mounted upon the frame 50 at 186, and provided with a coil spring 187 normally tending to rotate the bell crank in anti-clockwise direction to thereby move the lever 182 to release the roller 164. One end of this spring, it will be noted, bears upon a stop pin 188, while its other end is carried about one arm of the bell crank. The bell crank carries a roller 189, which in the releasing position engages a cam 190 mounted upon the end of the shaft 143. This cam is provided with a single rise which is adapted to move the bell crank lever to its position as shown in Fig. 2 for moving the lever 182 to grippingly engage the roller 164 with the roller 163. When moved to such position the upper end 191 of the bell crank which is in the shape of a tooth, engages a spring-pressed detent 192 pivotally mounted at 193 upon a plate 194 secured to the frame 50 and is retained in its position until the detent is moved to releasing position by means of its actuating solenoid 195, this solenoid being energized at a predetermined point by means of the automatic control mechanism, presently to be described. It will thus be seen that with each cycle of operation of the machine the cam 190 moves the bell crank 185, at a given point in the cycle, to cause the rollers 163 and 164 to feed the wire, and at a predetermined point which is variable for each successive cycle, according to the adjustment of the control mechanism, the actuation of the solenoid will stop the feeding through its releasing action upon the bell crank. As the wire is fed by the rollers from the coil through the pilot guide 162 and then through the tubular guide member 155, it is threaded through the perforations of the horizontal bars. The extremity of the wire thereupon co-operates, after a predetermined feeding, with the control mechanism which functions to stop the feeding. The wire cutting off mechanism hereinafter more fully referred to is then operated.

The control mechanism (Figs. 1, 7 and 11 to 13) is mounted at the rear of the frame 50 upon a supporting bracket 197, suitably bolted in place and provided with a downwardly extending portion 198 in which is supported a shaft 199. A ratchet gear 200 is mounted on the shaft and is adapted to be intermittently rotated by means of a pawl 201, the hub portion 202 of which is engaged by an eccentric roller 203 provided upon the back or counter drive shaft 59 so that upon every rotation of the shaft the pawl is moved to turn the ratchet gear through one tooth length. In order to prevent reverse movement of the ratchet gear a detent 204, pivotally mounted upon the bracket is pressed into engagement with the ratchet by means of a spring 205. The ratchet 200 is adapted to make one complete revolution during the formation of a single cage unit and its teeth correspond in number to the number of cycles through which the machine operates during the formation of such a unit. In other words, the teeth correspond in number to the number of vertical wires provided in the cage unit.

The ratchet gear has removably secured thereto a drum 206 which carries a number of contacts and so placed thereon as to close the circuits of solenoids provided for the purpose of controlling the operation of certain mechanism hereinafter more fully referred to. The drum is electrically insulated from the ratchet gear by means of an insulating layer 206$^a$.

The shaft 199 has mounted at its outer end a cam 207, which rotates through a complete revolution during the formation of a single cage unit, and which is adapted to determine the variable lengths of the individual vertical wires of the cage. This cam, it will be noted is of rectangular shape in the embodiment shown, and is adapted to determine the lengths of the wires for a cage which when completed has a corresponding rectangular shape. In forming a round cage the cam 207 would be circular so that all of the vertical wires would be of equal length. A bell crank lever 208 is mounted at 209 upon the bracket and is provided at its lower end with a roller 210 which rides upon periphery of the cam 207, being retained in engagement therewith by means of a spring 211 tied between the upright arm of the bell crank and the bracket. The upper end of the bell crank is connected by means of a link 212 to a slide 213 clamped to a reciprocating horizontal bar 214 guided in spaced bearings 215 and 216 formed upon a fixture 217 secured to the upper end of the bracket 197. This bar is adapted to be moved back and forth in the bearings by means of the cam 207, so that its forward end is variably spaced from the wire feeding mechanism in accordance with the position of the cam, being nearest the feeding mechanism when the roller 210 is engaged with the central portion of the longitudinal sides of the cam as indicated in Fig. 11; and being furthest from the feeding mechanism when the roller is engaged with the corners of the cam. The bar 214 is provided at its forward end with a plate 218 formed of insulating material such as fibre or the like, and has secured thereto a metal plate 219 projecting at one side, and provided with a forwardly bent horizontal portion 220, which supports a cone-shaped guide 221, having its apex perforated and disposed substantially in alignment with the axial line of feed of the wire. As the wire is fed forwardly its end is engaged in the cone-shaped member and extends through the apex thereof. The cone-shaped member is slotted along its side, as at 222, to permit the wire to be moved out of engagement therewith as the horizontal supporting bars are fed forward. The plate 218 supports an electrical terminal connection 223 electrically connected to the plate 219 and also supports another terminal connection 224 insulated from said plate 219. Upon the portion 220 there is pivotally mounted upon a vertical post 225 an angular contact member 226 having its front portion disposed in front of the apex of the cone shaped member 221 and in a position to be engaged by the end of the wire as it is fed through the same. A projected spring 227 on the member 226 engages a pin 228 on the portion 220 and yieldably retains the members in engagement with a stop pin 229. The side portion of the member 226 extends into spaced relation with a curved spring contact plate 230 connected to the terminal 224, and is adapted upon engagement of the wire with the member 226 to be contacted with the plate 230 to thereby close the electrical circuit from the terminal 223 through the plate 219 to the terminal 224. The terminals 223 and 224 are connected by conductors 231 and 232 (Fig. 14) to the circuit of the solenoid 195, and are adapted when the circuit is closed by pressure of the end of the wire with the member 226 to close the circuit of the solenoid, thereby disengaging the detent 192 from the lever 185, and causing the lever 182 to be moved to disengage the roller 164 to stop the feeding of the wire. The conductor 231 is connected to a brush 233 mounted upon an insulating supporting bar 234 above the drum 206 and this brush is in constant engagement with the drum 206. The drum is connected by a conductor 235 with a source of electrical energy 236, a cutting-off switch 237 being provided in the circuit of the conductor 235.

Upon actuation of the solenoid 195 to stop the feeding of the wire the wire cutting-off mechanism (Figs. 7 to 10) is brought into operation.

At the forward end of the spindle 152 there is mounted to rotate therewith a rectangular shaped head 238, provided at its front side with a pair of parallel spaced guide plates 239 and 240, under-cut at their inner edges, and in which there is guided a slidable tool carrier 241 disposed at one side of the line of feed of the wire, and provided with a bifurcated extension 242 extending at the other side of the line of feed and supporting at its end a block 243 in which there is adjustably mounted a contact screw 244. Within a slot 245 of the head 238 there is pivotally mounted a rocker lever 246 having one end extended into contacting relation with the contact screw 244 and the other end, which is rounded as at 247, extending into contact with the cone shaped surface 248 of a cup-shaped member 249 slidably mounted upon the spindle 152. The member 249 is provided with an annular recess 250, in which is engaged the forked shaped end 251 of a shifting arm 252 secured to a slide rod 253 mounted for sliding movement in bearings 254 and 255 provided upon a bracket 256 secured to the frame 50. A helical spring 257 disposed upon the rod 253, between the arm 252 of the bearing 255, is adapted to normally retain the bar in its retracted position, and in which position the forward end of the rock lever 246 is raised so that the tool holder 241 is moved to its outward position by the centrifugal force exerted thereon through rotation of the spindle.

The tool holder supports a cutting tool 258, the end of which is normally spaced from the wire being fed. Upon forward shifting of the member 249, the forward end of the rock lever 246 is depressed, and the tool holder moved inwardly to engage the tool with the wire, to cut off a length of the same.

A cross bar 259 is secured to the guide members 239 and 240 and extends across the space between them, being provided with a cut-out portion 260 shouldered as at 261 to support the wire during the cutting action. The end of the tool is beveled at its inner side, as shown at 262, to point the forward end of the wire which will be fed through the horizontal bars upon the next feeding operation, and to produce a straight cut at the end of the wire which has previously been threaded through the bars. This is clearly shown in Fig. 9. This latter cut produces a slight outwardly extending burr upon the end of the wire which serves to prevent the end of the wire from being pulled through the perforations of the last bar. It will be understood that the pointing of the wire facilitates its threading through the perforations of the bars.

In order to shift the bar 253, the same is pivotally connected at its outer end to the upper end of a lever 263, provided with an intermediate hub 264 pivotally mounted upon a stud shaft 265 and supported in a boss 266 formed upon the bracket 166. The lower end of this lever is provided with a roller 267 which rides upon the face of a cam disk 268 mounted upon the end of the shaft 143, and provided with an inverted V-shaped cam projection 269 adapted during a single cycle of operation of the machine to engage the roller 267 to oscillate the lever 263, this operation shifting the member 249 to cause the tool 258 to be moved into cutting relation, as before pointed out.

The lowermost bar of the cage structure is fed along the tool rail, adjacent the forward longitudinal side of the frame 50, through a longitudinally slotted guide member 270 having a flange 271 extending over the upper edge of the bar to retain the same therein, and projecting to a point in front of and just short of the guide opening through the wire threading mechanism, so that the first bar is fed in front of the said mechanism with its perforations brought intermittently in line therewith. The other bars are fed through guide devices on the other tool rails each of which comprise a block 272 mounted upon the rails and having a longitudinal slot 273 formed therein through which the bar is fed. A retaining plate 274 having a flange at its forward end extending into the slot 273 and engaging the upper side of the bar being fed thereby is held upon a pin 275 by a screw 276 and adapted to prevent the bar from riding upwardly and to thereby accurately align the perforation in the bar with the wire threading mechanism. A pair of spring plates 277 (Fig. 18) are also mounted upon the block 272 longitudinally of the line of feed of the bar and secured at their rearward end by screws 278, having springs 278$^a$ beneath their heads, their forward ends being bent downwardly and provided with a tapered guide surface 277$^a$ which cooperates with the guide means 272$^a$ of the plate 272 to provide a guide way for the wire as it is fed through the perforations of the bars. The resiliency of the plates 277 is such as to release the wires upon the feeding movement of the cage unit through the machine.

The door forming mechanism (Figs. 7 and 15 to 20) comprises a supporting plate 279 mounted upon the first tool rail by means of screws 280, and provided at its rear end with upwardly projecting bearing portions 281, in which is mounted a shaft 282 hingedly supporting a pair of co-operating upper and lower gate frame 283 and 284. The upper frame 283 is adapted to have short pieces of bar material for forming the door structure inserted therein, and to be automatically moved into operative position, to have the door structure incorporated into the cage unit, at a predetermined point, after the frame 283 is manually moved to its raised position as indicated in Fig. 15. For this purpose it is provided at its pivoted end with a downwardly projecting tooth or pawl 285, adapted to be engaged in the recessed end 286 of a vertically reciprocating detent 287, having bearing in a passage 288 provided in the upper part of the tool rail. The detent 287 is pivotally connected at its lower end, by means of a pin 289 engaging a slot 290 of a pivoted plate 291, mounted upon the tool rail by means of a screw 292, and having a slotted portion 293, pivotally connected to the end of the armature 294 of a solenoid 295 supported upon the tool rail. The solenoid 295 is connected by electrical conductors 296 and 296$^a$ (Fig. 14) to the main circuit of the battery 236 and to a brush 297 provided upon the insulating bar 234, and adapted to contact with contact pieces 298, 299 and 300 provided upon the drum 206, at predetermined points in the rotation of the drum to thereby energize the solenoid, thus causing the detent 288 to be drawn inwardly to release the pawl 285, whereupon the frame 283 drops by gravity into its operative position as indicated in Fig. 17. By changing the position of the contacts on the drum the points at which the solenoid is energized may be regulated as desired.

During the first and third operations of the frame 283 the same is adapted to insert the short strips of bar material C for the cup rest, these pieces in the finished cage unit being directly beneath the cup bends, and during the second operation of the frame, it is adapted to insert the bars D, E and F and the spring G of the door structure.

Upon the upper side of the frame 283 there are formed a series of parallel channels or guide ways 301, 302 and 303, the channels 301 and 302 adapted to have inserted therein two parallel strips for forming the upper and lower horizontal portions of the door, while the channel 303, which is of a length greater than the channels 301 and 302, to an extent corresponding to the space between two adjacent vertical wires of the cage unit, is adapted to receive a strip F of corresponding length to form the sill below the door. The forward ends of the channels are open so that the operator of the machine may insert the strips therein at some time before the predetermined point at which the mechanism is to be automatically operated, and while the frame 283 is in raised position. At their rear ends the channels are provided with stops 304, 305 and 306 to limit the insertion of the bars.

The channel 303 is also utilized for the purpose of incorporating the cup supports, and to this end has provided therein, at a point spaced from the forward end thereof, a push and draw pin 307 adapted to be pressed in by the operator so as to form a limiting stop extending transversely across the channel, or to be drawn out to provide a free passage therethrough. In the former position the short strip for forming the cup support is inserted.

A spring plate 308 is secured across the top of the channel 301 to retain the bar therein, and a similar spring plate 309 extends across the channels 302 and 303 for the same purpose. An additional spring plate 310 extends across the channel 303 of the forward end thereof for the purpose of retaining the short cup supporting bar therein.

It will be understood that the short strips that are inserted in the frame 283 have perforations formed therein corresponding to the perforations through the horizontal bars of the cage unit, and when inserted in the support are so positioned that the perforations at the forward ends are in alignment with the line of feed of the vertical wires during the threading operation. In order to accurately guide the vertical wires through the perforations of the bars, a resilient spring guide 311 similar in construction to the guide 277 is secured to the frame 283, its forward end being tapered as at 312 and co-operating with a guide recess 313 at the forward edge of the frame and along which the wire is fed.

The frame 284 is for the purpose of providing a guide for the vertical wires being fed when the door forming mechanism is inoperative, and for this purpose is adapted to be raised into its operative position, which is determined by means of an adjustable stop screw 314 in the frame 284, by means of a spring 316 coiled about the shaft 282 and having its respective ends engaging the upper side of the frame 283 and the lower side of the frame 284. When the frame 283 is manually lifted by means of a handle 317 provided thereon, the spring 316 exerts a lifting pressure upon the frame 284 thereby moving it to its operative position. In the operative or lowered position of the frame 283 a projection 318 thereof engages the frame 284 in a manner to depress it to its in-operative position as indicated in Fig. 17. An adjustable screw 319 in the frame 283 is adapted to engage a stop 320 provided upon the support 379 to limit the downward movement thereof and to accurately position it.

At the forward end of the frame 284 there is provided a right-angular upwardly projecting portion 321 having a recess 322 formed therein, and from which extends a pair of spring plates 323 and 324 bent downwardly into engagement with the rear wall of the portion 321, and supported thereon by means of screws 325, upon which are mounted coil springs 326 to permit yieldable movement of the spring plates. The forward ends of the spring plates are cone-shaped as at 327 and are diverging in the direction of feed of the wire.

At the forward end of the frame 283 between the channels 302 and 303 there is formed a recess or pocket 328 of cylindrical form, and into which the operator of the machine inserts the coil spring G for the door structure. The recess is so arranged that when the spring is inserted the passage through the same is in line with the feed of the vertical wires being threaded into the cage unit. A retaining plate 331 is mounted upon a screw 332 beneath the spring 333, and is provided at its forward downwardly enlarged end 334 with a recessed portion 335 adapted to yieldably engage the upper side of the spring to retain the same in place.

In operation, the attendant inserts one of the short support bars C in channel 303 with the stop pin 307 pushed into position across the channel, this operation being performed at any time previous to the predetermined point at which it is desired to automatically insert the support. Eventually the contact 298 upon the drum 206 engages the brush 297 thereby causing the solenoid 295 to be energized and the detent 288 to be drawn inwardly to release the frame 283, which drops into its lower position, at the same time depressing the frame 284 to its in-operative position. Thereupon the vertical wire, which is next fed into the cage unit, passes through the first perforation of the cup support bar as well as the perforations of the horizontal bars of the cage unit. The feeding mechanism then operates to move the cage unit forwardly for the feeding of the next vertical wire and during the forward movement the cup supporting bar is drawn through the channel 303 to bring its second perforation into line with the wire feeding mechanism. The wire is then fed through this second perforation as well as the perforations of the horizontal bars of the unit, and upon the next feeding movement of the cage unit the cup supporting member is moved out of the channel 303.

The attendant then raises the frame 283 by means of the handle 217 to its in-operative position, and proceeds to insert the bars for the door structure so that the mechanism will be ready to be automatically operated to incorporate the door structure in the cage unit at the proper time. Two equal length bars for forming the upper and lower frame portions of the door structure are inserted in the channels 301 and 302, and a longer bar for forming the sill of the door is inserted in the channel 303; also the coil spring for the door is placed in the recess 328 beneath the retaining plate 331. At the proper time the contact 299 engages the brush 297, energizing the solenoid 295, and causing the frame 283 to be again released to its operative position. A vertical wire is then threaded through the first perforation of the sill, the coil spring and perforations of the upper and lower bars of the door, as well as through the parallel bars of the cage unit. Upon the next forward feeding movement of the cage unit the door structure will be moved through the channels 301, 302 and 303, for a distance corresponding to the distance between two adjacent vertical wires, whereupon the next vertical wire is threaded through the second perforations of the bars. In similar manner the vertical wires are succesively fed through the other perforations of the three bars, following each forward feeding movement of the cage unit, until the door structure is freed from the frame 283.

The attendant now raises the frame 283 to its in-operative position and after pushing the pin 307 to its position across the channel 303 inserts another one of the short cup supporting bars therein, so that the mechanism is ready to be again automatically operated to incorporate the cup supporting bar into the cage unit. At the proper time the contact 300 engages the brush 297 to energize the solenoid 295 and release the frame 283, and the cup supporting bar is incorporated in the frame in a similar manner to the first cup supporting bar.

After the completion of the cage unit, the vertical wires, with the exception of the one engaging the perforations at one end of the upper and lower bars of the door structure are cut above and below the same to permit the door to swing, this operation being performed after the unit is removed from the machine.

The cage unit, after having the vertical wires threaded therein, next passes to a mechanism adapted to clinch the perforated portions of the horizontal bars into tight gripping relation with the vertical wires to prevent shifting movement of the latter. This mechanism (Figs. 1, 21 and 22) comprises upper and lower co-operating clinching means, the upper clinching means being mounted upon a bridge 350, supported at its forward end upon a standard 351 secured to the forward side of the frame 50, and at its rear end upon a standard 352 secured to the rear side of the frame 50, and curved upwardly and outwardly therefrom to allow the passage through the machine of the projecting upper ends of the vertical wires. The bridge is longitudinally recessed as at 353 and has secured in the recessed portion a guide bar 354, provided with a dove-tail extension upon which a plurality of anvil supports 355 are mounted for longitudinal adjustment. These anvil supports are adapted to co-operate with the upper edges of the horizontal bars of the cage unit and correspond in position to their line of feed through the machine. These supports are provided at their rear side with channels 356 adapted to engage the dove-tail guide 354. A set screw 357 in the upper portion of the support 355 engages the upper side of the bar 354 to clamp said support in its adjusted position. The forward portion of the support is provided with a vertically disposed cylindrical passage therethrough, in the lower end of which there is mounted an anvil 359 provided with a longitudinal key slot 360, engaged by a set screw 361 in the support to fix the position of the anvil. The upper end of the anvil is provided with a screw 362 engaged in the upper threaded portion of the passage 356, and adapted by adjustment to determine the amount of projection of the anvil, and the lower end of the anvil is provided with a notch or recess 363 engaged by the upper edge of the horizontal bar of the cage unit guided therethrough.

Certain of the anvils are adapted to operate upon the cup supporting bars and the door structure bars and may be manually moved into and out of operative position by means of handles 359a. They are normally in operative position, however, being ineffective until the bars come into relation therewith.

Beneath the anvil there is provided a clinching bar 364 provided at its lower end with a flange 365, and seated in the upper recessed ends 366 of a plurality of vertically reciprocating rods 367, clamping plates 368 being provided upon said upper ends 366 and engaging the flanged portion 365 of the clinching bar to secure the same. A clinching plate 369 is secured in a recess 370 at the rear side of the bar 364 by means of screws 371, and projects above the upper side of the bar, this plate being positioned directly beneath the anvils and in line with the vertical wires of the cage unit, when the same is intermittently stopped during its progression through the machine. During this stopping interval the clinching bar is adapted to be pressed upwardly, and thereby clinches the perforated portions of the horizontal bars of the cage unit into tight relation with the vertical wires.

The rods 367 are slidably mounted in spaced bearings 372 and 373 provided upon the forward sides of the tool rails which are respectively provided at this point with downwardly extending portions 374, each having a hub 375, which is engaged upon the annularly recessed hub portion 376 of cams 377, mounted upon a transversely disposed shaft 378 journaled at its ends in bearings 379 and 380 secured to the longitudinal sides of the frame 50. The shaft 378 is provided at its rear end with a beveled gear 381 meshing with a beveled gear 382 provided upon the counter shaft 59. The rods 267 are respectively provided at their lower ends with rollers 383 which ride upon the cams 377 and are held in yieldable engagement therewith by means of spring 384, provided upon the rods between the bearing portion 372 and collars 385 secured to the rods. The cams 377 for operating the several rods 367 are of identical form and are adapted to simultaneously raise and lower the rods to thereby impart a uniform clinching impulse to the clinching bar 364.

The cage unit is next operated upon by the perch support bending mechanism and the cup bend forming mechanism (Figs. 1, 23 and 24). A lever 386 is pivotally mounted upon an angular bracket 387 bolted to the upper end of the front side of the frame 50, and is provided at its upper end with a head 388 supporting the series of forwardly projecting wedge cams 389, 390 and 391, these cams being slotted as at 392 and secured by bolts 393, so that the same may be adjusted forwardly and rearwardly, and being held against displacement between guide bosses 394 formed upon the head and engaging the sides of the cams. A boss 395 is formed upon the head rearwardly of the cams and supports set screws 396 bearing upon the rear ends of the cams, and adapted to fix their positions of adjustment. The cam 389 is adapted to oscillate a lever 397 pivotally mounted upon a stud bolt 398, secured to a rockable support 399, pivotally mounted upon a horizontally disposed shaft 400 secured at its ends in the upstanding end portion 401 and 402 of a bracket 403 secured to the first tool rail. The lever 397 is provided at its end with a roller 404 which engages the cam 389, and is held in contact therewith by means of a spring 405 tied between the lever and the bracket. At its forward end the lever is provided with a crimping die 406, secured thereto by screws, and provided with a crimping point 407 adapted to co-operate with a stationary die 408 secured to the rockable support 399 and having anvil portions 409 and 410 disposed at either side of the point 407. As indicated in Fig. 1 the stationary die engages at one side of a vertical wire of the cage unit while the die mounted upon the lever 397 engages at the other side, and by oscillation of the lever causes the point 407 to co-operate with the anvils 409 and 410 to produce a crimp H in the wire, which functions in the finished cage as a perch support. In the cage unit illustrated in the present embodiment, four such perch supports are formed, so that during the major portion of the operation of the machine the perch support forming mechanism is inoperative, and is adapted to be brought into operation only at predetermined points, which are controlled by the automatic control mechanism.

This mechanism is adapted to rock the rockable support 399 so as to raise the movable and stationary dies into co-operative relation with the vertical wire of the cage unit, and when in such relation the oscillatory impulse upon the movable die causes the crimp to be imparted to the vertical wire. According to the present embodiment, these oscillatory impulses are imparted to the lever 397 during each cycle of the machine, but are only operated to crimp the cage when the forward end of the rockable support 399 is raised.

The lower end of the lever 386 is connected by a connecting rod 411 to a bell crank lever 412 pivotally mounted at 413 in a bracket 414 secured to the rear side of the frame 50, and provided with a roller 415 riding upon the periphery of a cam 416 mounted upon the counter shaft 59, this cam having a gradual rise and a quick stop so that the crimping lever operating cam 389 is moved forwardly with a relatively slow movement to move the crimping die slowly into its crimping relation, and is retracted with a relatively rapid movement. A spring 417 secured between the connection of the rod 411 with the lower end of the lever 386 and a bracket 418, supported upon the front side of the frame 50, normally retains the roller 415 in engagement with its cam.

The rockable support 399 is provided with a downwardly extending arm 419 having a spring 420 (Fig. 2) secured thereto by means of a screw, the upper end of the spring bearing upon the arm 419, while the lower end is engaged with the lower portion of the tool rail to thereby normally retain the rockable support 399 in its depressed or inoperative position. Beneath the arm 419 there is mounted a transversely disposed shaft 423 slidably supported at its end portion in the front and rear sides of the frame 50, and provided at its rear end with a yoke 424, mounted for longitudinal movement upon a rectangular guide block 425 loosely mounted upon the shaft 59. The yoke is provided at its end with a roller 426 riding upon the cam 427, adapted to intermittently reciprocate the shaft 423, and so designed as to allow the shaft to remain for an appreciable period at each end of its reciprocating movement. The roller 426 is retained in engagement with the cam 427 by means of a spring 428, secured between a hook 429 secured to the frame 50 and a screw 430 provided upon a bracket 431, mounted upon the intermediate portion of the shaft 423 and movable therewith. This bracket is provided at one side with an upstanding lug 432 upon which there is pivotally mounted a lever 433 connected at its rear end to the armature 434 of a solenoid 435 supported upon the bracket 431. At the forward end of the lever 433 there is provided a hook shaped portion 436, adapted when the armature is withdrawn through energization of the solenoid, to be moved into a raised position to engage a button 437 provided at the lower end of the lever 419, and when the solenoid is de-energized to reciprocate beneath the said button out of contact therewith. It will thus be seen that upon energization of the solenoid the reciprocation of the shaft 423 will cause the hooked end 436 to engage the button 437 to thereby swing the arm 419 and lift the rockable support 399 to move the crimping dies into operative relation with the vertical wire of the cage unit. The point at which this operation occurs is determined by the automatic control mechanism and for this purpose the solenoid is electrically connected thereto by means of conductors 438 and 439 (Fig. 14) to the main circuit of the batteries 236 and to a brush 440 provided upon the insulating supporting bar 234, the brush adapted to be contacted by means of contact pieces 441, 442, 443 and 444 provided upon the drum 206. The drum is in constant electrical connection with the batteries 236 at one side through the conductor 235.

It will be understood that the contacts are arranged upon the drum in such position that they will contact with the brush 440 at the points in the cage unit where it is desired to form the perch supports, there being four such supports in the present embodiment.

The mechanism for forming the cup bend I is substantially similar in its general arrangement, construction and operation to the perch support forming mechanism and comprises a rockable support 450 pivotally mounted upon the shaft 400 adjacent the rockable support 399. A pair of levers 451 and 452 are pivoted upon the support 450 by means of bolts 453 and 454, and at their rear ends are provided with rollers 455 and 456 which engage the cams 390 and 391, being yieldably retained in engagement therewith by means of a horse-shoe-shaped spring 457 connected at its ends by screw 458 and 459 to the respective levers 451 and 452.

At forward ends of the levers 451 and 452 there are provided die portions 460 and 461, which have convex outwardly projecting portions and which co-operate with the concave portions 462 and 463 of stationary dies 464 and 465 secured to the forward end of the rockable support 450. The rockable support is normally in its lowered position so that it is inoperative to co-operate with the vertical wires of the cage, but the levers are oscillated during each cycle of the operation of the machine, in a similar manner to the oscillation of the perch support forming lever 397 through oscillation of the lever 386.

The rockable support 450 is provided with a downwardly extending arm 466 similar to the arm 419 and provided with a spring 467 adapted to normally retain the same in its lowered position and having a button 468 provided at its lower end. This button is adapted in similar manner to the operation of the arm 419 of the perch support forming mechanism, to be engaged by means of the hook-shaped end 469 of a lever 470 pivotally mounted upon a lug 471, provided upon the bracket 431, and connected at its rear end to the armature 472 of a solenoid 473, mounted upon the bracket 431 in opposed relation to the armature 435. In order to energize the solenoid 473 at predetermined periods during the formation of the cage unit it is connected by conductors 474 and 475, Fig. 14, to the main circuit of the battery 236 and to a brush 476 mounted upon the insulating supporting bar 234, and which co-operates with contacts 477 and 478 provided at suitable spaced points upon the drum 206.

A channel guide 490 for the lower bar of the cage unit is secured at its ends to the portions 401 and 402 of the bracket 403 and extends above the perch support and cup bend forming mechanisms. A support 491 is also mounted upon the second tool rail and is adapted to support the second horizontal bar of the cage unit, these two supports co-operating to maintain the position of the bars during the formation of the perch supports and cup-bends.

The cage unit is next operated upon by crimping means (Figs. 1 and 25 to 27) for forming the crimped eave portion J and for bending the upper ends of the vertical wires at K to produce the roof or top of the cage. A bridge 493 is mounted in spaced parallel relation to the bridge 350 upon the standards 351 and 352 and has mounted for longitudinal adjustment thereon a plate 494, slotted as at 495 and 496 and secured to the bridge by means of bolts 497 and 498. A pair of anvils 499 and 500 are mounted in off-set relation upon the intermediate portion of the plate 494, and for the purpose of off-setting the anvil 500, the plate 494 is provided with a projecting support 501 having vertical flanges at its forward side, between which the anvil is adjustably secured by means of a bolt 502 engaged with a slot 503 in the anvil, the upper end of the anvil being fixed in position by means of a thrust screw 504 provided in a boss 505 formed upon the plate above the anvils.

The anvil 499 is mounted for vertical adjustment between the side wall of the portion 501 and the vertically disposed guide flange 506 and is secured by means of a bolt 507 extending through a slot 508 of the anvil, and being fixed in position by means of a thrust screw 509 provided in the boss 505 and engaging the upper end of the anvil.

The anvil 499 is provided with a recessed formation 510 at its lower end adapted to co-operate with a movable die, presently to be referred to, to produce a crimp in the vertical wires of the cage unit below the upper horizontal bar thereof. The anvil 500 is provided with a recessed formation 511 also adapted to be engaged by a removable die member, presently to be referred to, to produce the outwardly curved bend or eave at the upper end of the cage unit, and to bend the free ends of the vertical wires downwardly to produce a top or roof structure. It will be understood that the anvils are off-set so that they will not operate upon the same vertical wire at the same time.

The rear tool rail is provided with a vertically disposed guide way 512 in which there is mounted for vertical reciprocation a slide bar 513, provided at its lower end with a roller 514 adapted to ride upon a cam 515, mounted upon a transversely disposed shaft 516, journalled at its ends in bearings 517 and 518 provided in the side portions of the frame 50. A beveled gear 519 is supported upon the rear end of the shaft 516 and meshes with a beveled gear 520 provided upon the countershaft 59. The roller is retained in engagement with the cam by means of a spring 521 secured between a projecting lug 522 provided upon the slide 513 and a stationary pin 523 secured to the tool rail. The slide 513 has die members 524 and 525 secured at each side thereof by means of a bolt 526 engaged through slots 527 and 528 of the die members, these members being fixed in their adjusted position by means of thrust screws 529 and 530 mounted in the upper shouldered portions 531 and 532 of the slide.

The die numbers 524 and 525 are provided with projecting formations 533 and 534 which co-operate with the recessed portions 510 and 511 of the anvils 499 and 500 to crimp the vertical wires of the cage unit upon the upward impulse of the slide.

The rear tool rail is provided at this point in the machine with a downwardly extending bracket 537 having its lower end provided with a bearing 538 which engages the annular recessed hub portion 539 of the cam 515 to support the rail against the downward strain exerted thereon during the crimping operation.

In order to positively feed the cage unit through the machine, auxiliary feeding means are provided, in addition to the reciprocating feed including the gripping blocks 93 and 94 (Figs. 3 and 4) and which as before pointed out intermittently feed the horizontal bars through the machine before the insertion of the vertical wires. This means has the effect of pushing the bars through the machine. The auxiliary means (Figs. 1, 17 and 28 to 31) presently to be described, co-operates with the first feeding means to positively draw or pull the cage unit through the machine after the insertion of the vertical wires, and also after the unit is operated upon by the several shaping mechanisms. Upon each of the tool rails, at a point beyond the mechanism for producing the eave and top structure of the cage unit, there is pivotally mounted at 540 a lever 541, provided at its lower end with a roller 542, which rides upon one of a series of cams 543, mounted upon a transverse shaft 544 having its ends journaled in bearings 545 and 546 of the frame 50, and provided at its rear end with a beveled gear 547 which meshes with a beveled gear 548 provided upon the counter shaft 59. A spring 549, tied between the upper arm of the lever and a pin 550 secured to the tool rail, normally retains the roller 542 in engagement with the cam. At the upper end of the lever 541 there is pivotally mounted a tubular support 551 disposed at an inclination and provided at its forward end with a diametric slot 552 in which is non-rotatably engaged the end of a feed member 553 of rectangular cross section and having its shank 554 extending through a reduced passage 555 in the forward arm of the support. Adjustable lock nuts 556 are engaged upon the threaded end of the shank and a spring 557 is disposed upon the shank 554 between the lock nut and the shoulder formed in the passage 555. The construction permits the members 553 to yield forwardly under any desired tension determined by the adjustment of the nuts 556.

The forward end of the member 553 is pointed and provided with a toothed projection 558 adapted to engage behind one of the vertical wires of the cage unit, and upon forward oscillation of the lever 541, to pull the same through a distance corresponding to the space between two vertical wires.

The member 553 is depressable, in order to permit disengagement from the cage unit and reengagement with one of the wires upon the forward oscillation thereof, through the action of a curved leaf spring 559, secured to the upper end of the lever 541, and shaped at its end portion to form a pocket 560 in which rests a pin 561 secured to the support 551.

A somewhat similar feeding mechanism, co-operatively connected to the mechanism just described, is provided adjacent the door forming mechanism and is adapted to insure the positive feed of the short horizontal door-forming bars from the grooves of the gate frame 383. Upon the first tool rail at the point in the machine just forward of and contiguous to the door forming mechanism there is pivotally mounted at 562 a lever 563 connected by a wire 564 having a spring section 565 formed therein to the lever 541 and is adapted to be oscillated simultaneously and equally to the oscillation of the said lever 541 through the action of the cam 543. At its upper end the lever is provided with a pivoted feed device 566 having a pointed hook end portion 567, and depressable by means of a spring 568 secured between its end and the lever 564. A spring 569 is secured between the lever 563 and a screw 570 on the tool rail and is adapted to yieldingly hold the lever in its forward position. It will be understood that the action of this feeding device is similar to the action of the device provided at the upper end of the lever 541, and the function of both of them is to prevent any likelihood of the cage unit becoming jammed or working out of place during its feed through the machine.

One cage unit is now completed and is adapted to be severed from the horizontal bars of the next cage unit being formed. Upon each of the two tool rails (Figs. 1 and 32 to 34) there is provided a vertically disposed slideway 579 in which a slide member 580 is mounted to reciprocate, being held in the slide by means of gib plates 581. The lower projecting end of the slide rises upon the peripheral surface of a cam 582, mounted upon a transverse shaft 583 journaled in bearings 584 and 585 of the frame 50. It should be here pointed out that this shaft 583 and its cams are adapted through mechanism, presently to be referred to, to be rotated through a single revolution at a predetermined point, determined by the automatic control mechanism, and through this single revolution it operates the cutting-off mechanism to sever the cage unit.

The slide member 580 is provided at one side with a longitudinal flange 586 projecting laterally at its upper end as at 587 and supporting the stationary cutting blade 588. Upon the flange 586 there is pivotally mounted at 589 a lever arm 590, supporting at its upper end a movable cutting blade 591, which is adapted to co-operate with the blade 588 in the manner of a pair of scissors. The lower end of the lever 590 is rounded, as at 592, and is adapted to be engaged and projected, to oscillate the cutting blade inwardly, by means of a roller 593 rotatably supported in an opening 594 of the cam 582 upon a post 595, and projecting from the surface of the cam so that during the single revolution thereof it engages the end of the lever 590 to thereby oscillate it. The design of the peripheral surface of the cam 582 is such that during the single revolution thereof, the slide member 580 is lifted with the cutting members 588 and 591 separated so as to embrace the horizontal bar of the cage unit. When in this position the roller 593 engages the lower end of the lever 590 and thereby causes the cutting member 591 to be moved into co-operative relation with the stationary cutting member 588 to cut off the completed cage unit.

Upon the counter-shaft 59 there is loosely mounted a beveled gear 596 meshing with a beveled gear 597 provided at the end of the shaft 583, the gear 596 being provided with an enlarged hub 598 having an annular channel 599 formed therein. In the hub 598 there is provided a transversely disposed slide-way 600, in which there is slidably disposed a dog 601 having an intermediate cut-out 602 normally disposed in the channel portion 599 of the hub and adapted through the action of a spring 603 disposed in a pocket 604 at the inner end of the dog and bearing upon a cover plate 605, to have its end portion projected rearwardly of the hub 598. Upon a bracket 606 secured to the frame 50 there is pivotally mounted a cam lever 607 having its end portion normally engaging the channel 599 of the hub 598 and provided with a beveled surface 608 which is adapted to engage in the cut-out portion 602 of the dog 601, to thereby retract the same and retain it in retracted position, and in which position the gear 596 is non-rotatable. A spring 609 normally retains the lever 607 in engagement with the channel 599.

Adjacent the rear end of the hub 598 there is mounted upon the shaft 59 a chuck head 610 keyed to the shaft for rotation therewith, and provided upon its surface adjacent the end of the hub 598 with a recess 611, having an inclined wall 612 at one end and a straight wall 613 at the other end, this recess being adapted to be engaged by the dog 601, upon its release by the lever 608, and its projection through the action of the spring 603, to thereby cause the hub 598 and its gear 596 to be rotated with the chuck 610.

The chuck 610 is provided upon its peripheral surface with a cam portion 614 upon which rides the roller 615 provided at the end of a lever 616 pivotally mounted upon the bracket 606 and normally retained in engagement with the cam through the action of a spring 617. This lever 616 is oscillated during each rotation of the shaft 59. Adjacent the hub portion of the lever 616 there is provided an enlargement 618, having a socket 619 therein adjacent the surface of the lever 607. A locking pin 620 is slidably mounted in a passage 621 of the lever 607, this pin being in line with the socket 619 when the lever 616 is in its raised position; that is, the position when the rollers 615 is riding upon the lower portion of the cam. The locking pin 620 is connected by a flexible insert 622 to the upper end of a lever 623 pivotally mounted at 624 upon a bracket 625 secured to the frame 50 and connected at its lower end to the armature 626 of a solenoid 627 also supported upon the bracket 625. A spring 628 normally retains the lever 623 in its inoperative position against a stop 629. The solenoid is connected by conductors 630 and 631 to a brush 632 mounted upon the insulating bar 234, and adapted to be engaged by a contact 633 which it will be understood, is at a point upon the drum which represents the completion of one complete revolution thereof and therefore the completion of a single cage unit. Upon energization of the solenoid 627 the locking pin 620 is pressed inwardly and when the socket 619 comes into alignment therewith, through the raising of the lever 616, it is projected into engagement with the socket, thereby causing the next downward oscillation of the lever 616 to carry the lever 607 with it. This action releases the dog 601 and as the recess 611 of the chuck 610 comes into relation therewith the same is projected into locking engagement with the recess 611 and the gear 596 is caused to rotate with the chuck. Immediately after the release of the dog through the outward movement of the lever 607 the solenoid is de-energized and the lever 607 freed from the lever 616, so that it can move into engagement with the base of the channel 599 and into the path of the dog 601. Upon the completion of a single revolution, the beveled portion 608 of the lever 607 re-engages the cut-out portion 602 of the dog withdrawing it and disengaging its end portion from the recess 611 of the chuck to stop the rotation of the gear 596.

As the completed cage unit is severed it may be conveyed from the machine by means of a suitable conveyor or deposited in a suitable receptacle; but inasmuch as such means is not considered a part of the present invention, it is not shown.

Figures 36, 37:
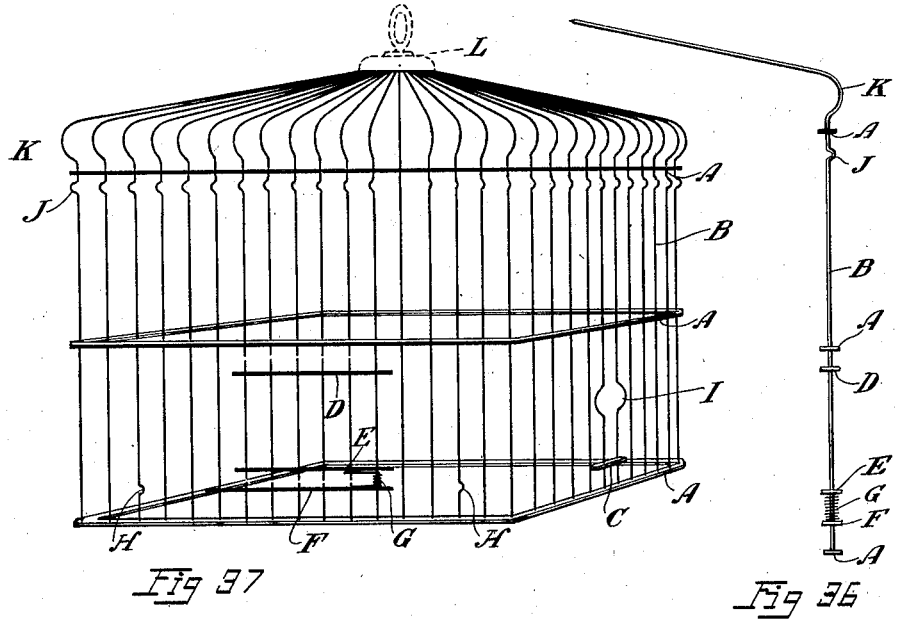
Fig. 36 is an end view thereof.
Fig. 37 is a perspective view of the completed cage.
Figure 35:
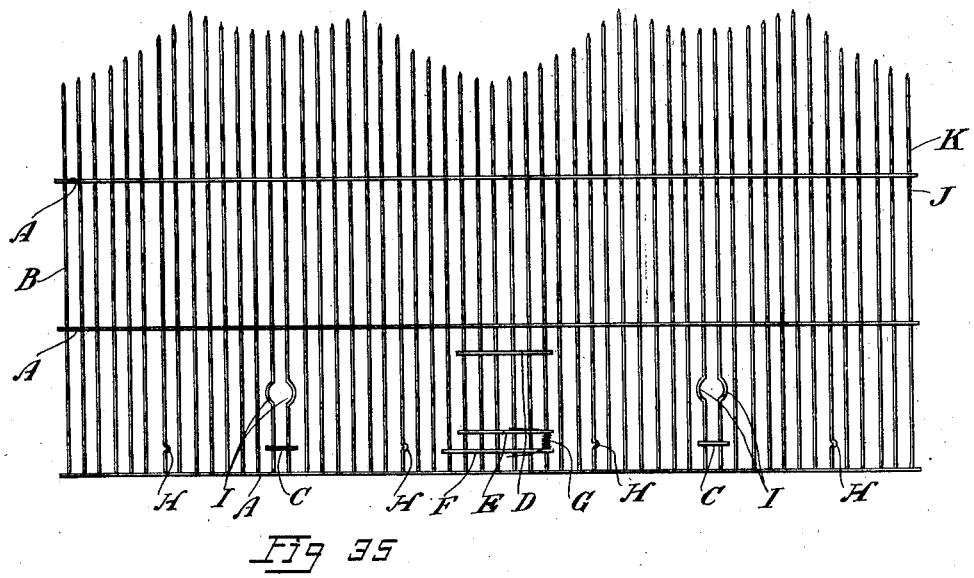
Fig. 35 is a plan view of the completed cage unit.

The machine illustrated shows the provision of four horizontal bars in the cage unit and the door structure between the two lower bars. In Figs. 35 and 37 three horizontal bars are shown. It will be understood that any desired number of bars may be provided and that the door may be provided between any two adjacent bars by merely shifting the door forming mechanism to proper tool rail.

Also the tool rails may be spaced to produce any desired spacing between the horizontal bars, the feeding mechanism may be regulated to change the spacing of the vertical wires, and the perforations and gauge of wire varied as desired. By changing the position of the contacts upon the drum 206 the various predetermined operations may occur at any point desired in the cage unit.

Figs. 35 and 36 show the cage unit as it comes from the machine, and comprising a plurality of horizontal bars A, and vertical wires B, the latter being crimped at J to form an eave, and bent at K to produce a roof; while certain of them are shaped as at H and I to form perch supports and cup holding bends. The unit is furthermore provided with short cup forming bars C, door forming bars D and E, a sill bar F, and a door operating spring G. It will be understood that the vertical wires above and below the bars D and E, with the exception of the wire engaged by the spring G, are cut, as indicated in Fig. 37, to permit the door to swing. The unit illustrated is adapted to form a rectangular cage, the horizontal bars A being bent laterally to form the corners, and being soldered or otherwise suitably secured at their ends. The roof portions of the wires B are brought to a common center, being then soldered to a cap L. The various fittings are then placed in the cage; that is, the swing, perch bars, cups, etc., and the cage is assembled to a sheet metal base, in the usual manner. In producing a circular cage the wires B will be of uniform length, and the horizontal bars A bent laterally into circular form.

I have illustrated and described a preferred and satisfactory embodiment of the invention but it is obvious that changes may be made therein within the spirit and scope thereof, as defined in the appended claims.

Having thus described my invention, what I claim and desire to secure by Letters Patent is:—

1. In a machine of the character described, means adapted to intermittently feed a bar or the like, means adapted to produce spaced wire receiving portions for receiving wires or the like transversely therethrough, and means adapted to intermittently feed said wires or the like intermittently and endwise into relation with said spaced receiving portions of the bar in the intervals between the intermittent feed of the bar.

2. In a machine of the character described, means adapted to intermittently feed a plurality of bars or the like in spaced parallel relation, said bars having spaced and aligned portions for receiving wires or the like at right angles thereto, and means adapted to intermittently feed individual wires or the like intermittently and endwise into relation with the respective aligned receiving portions of the several bars in the intervals between the intermittent feed of the bars to connect them.

3. In a machine of the character described, means adapted to intermittently feed a metal bar or the like, means adapted to produce spaced perforations for receiving wires or the like transversely therethrough, and means adapted to intermittently feed said wires or the like intermittently and endwise through said perforations in the intervals between the intermittent feed of the bar.

4. In a machine of the character described, means adapted to intermittently feed a bar or the like through equal increments, means adapted to perforate said bar or the like in the intervals between the intermittent feed of the bar to produce spaced perforations in the bar, and means adapted to intermittently thread wires or the like through said perforations in the intervals between the intermittent feed of the bar.

5. In a machine of the charcater described, means adapted to intermittently feed a plurality of spaced parallel bars or the like, means disposed in transverse alignment and adapted to perforate said bars in the intervals between the feeding of said bars to produce spaced aligned perforations therein, and means adapted to intermittently thread wires or the like through said aligned perforations in the intervals between the intermittent feed of the bars.

6. In a machine of the character described, transversely adjustable means adapted to intermittently feed a plurality of spaced pre-formed wire receiving parallel bars or the like having spaced portions for receiving wires or the like transversely, and means adapted to intermittently feed individual wires or the like intermittently and endwise into relation with the respective aligned spaced receiving portions of the bars in the intervals between the intermittent feed of the bars to connect them.

7. In a machine of the character described, means adapted to intermittently feed a bar or the like having spaced portions for receiving wires or the like transversely therethrough, means adapted to intermittently feed said wires or the like into relation with said spaced receiving portions of the bar in the intervals between the intermittent feeding of the bar, and means adapted to secure said wires or the like in said receiving portions against transverse displacement.

8. In a machine of the character described, means adapted to intermittently feed a bar or the like having spaced portions for receiving wire or the like transversely therethrough, means adapted to intermittently thread said wires or the like through said perforations in the intervals between the intermittent feed of the bar and means adapted to clinch the perforated portions of said bar to prevent transverse displacement of the wires.

9. In a machine of the character described, means adapted to intermittently feed a bar or the like, means adapted to produce spaced wire receiving portions for receiving wires or the like transversely therethrough, means adapted to feed a wire or the like intermittently and endwise into relation with said spaced receiving portions of the bar in the intervals between the intermittent feed of the bar, and means for intermittently severing a length of said wire or the like after it has been fed into relation with said receiving portions of the bar.

10. In a machine of the character described, means adapted to intermittently feed a bar or the like, means adapted to produce spaced wire receiving portions for receiving wires or the like, means adapted to feed wires or the like intermittently and endwise, into relation with said spaced receiving portions of the bar and means for intermittently feeding the bar in one direction along said guiding means in the intervals between the feeding of the said wires or the like, and comprising a reciprocating member adapted to move to and fro in relation to said bar, gripping means carried by said member and means adapted to co-operate with said gripping means to positively engage the said gripping means with the bar during the forward movement of said member and to release said gripping means during the rearward movement thereof.

11. In a machine of the character described, means adapted to intermittently feed a bar or the like, means adapted to produce spaced wire receiving portions for receiving wires or the like, means adapted to feed wires or the like intermittently and endwise into relation with said spaced receiving portions of the bar, and means for intermittently feeding the bar in one direction along said guiding means in the intervals between the feeding of the said wires or the like, and comprising a reciprocatory slide, a lever adapted to reciprocate the slide, cam means for actuating the lever and gripping means carried by the slide adapted to positively grip the bar during the forward movement of the slide and to release the same during the rearward movement.

12. In a machine of the character described, means adapted to intermittently feed a bar or the like, having spaced portions for receiving wires or the like, means adapted to intermittently feed wires or the like into relation with said spaced receiving portions of the bar, and means for intermittently feeding the bar in one direction along said guiding means in the intervals between the feeding of said wires or the like, and comprising a reciprocatory slide, gripping means carried thereby on either side of said bar, means operative at the end of the rearward movement of the slide to engage said gripping means with said bar and means operative at the end of the forward movement of the slide to disengage the gripping means from the bar.

13. In a machine of the character described, means adapted to intermittently feed a bar or the like, having spaced portions for receiving wires or the like, means adapted to intermittently feed wires or the like into relation with said spaced receiving portions of the bar and means for intermittently feeding the bar in one direction along said guiding means in the intervals between the feeding of the said wires or the like, and comprising a reciprocatory slide, gripping means carried by said slide at either side of said bar, pressure means adapted to co-operate with one of said gripping means to engage and release the bar, means adapted to actuate said pressure means to engage and release the bar, means adapted to actuate said pressure means to engage and release the bar and means co-operating with said last named means adapted to be actuated at the end of the rearward movement of the slide to engage said gripping means with the bar and to actuate it at the end of the forward movement to disengage it.

14. In a machine of the character described, means adapted to intermittently feed a bar or the like, having spaced portions for receiving wires or the like, means adapted to intermittently feed wires or the like into relation with said spaced receiving portions of the bar and means for intermittently feeding the bar in one direction along said guiding means in the intervals between the feeding of the said wires or the like, and comprising a reciprocatory slide, gripping means carried by said slide at either side of said bar, a lever adapted to be actuated to engage and release one of said gripping means with the bar, a wedge member adapted to be engaged and disengaged with said last named means, and means adapted to actuate said wedge member at the end of the rearward movement of the slide to engage the said gripping member with the bar and to actuate said wedge member at the end of the forward movement of the slide to disengage it.

15. In a machine of the character described. means adapted to intermittently feed a bar or the like, having spaced portions for receiving wires or the like, means adapted to intermittently feed wires or the like into relation with said spaced receiving portions of the bar, and means for intermittently feeding the bar in one direction in the intervals between the feeding of said wires or the like, and comprising a reciprocating slide, a lever adapted to be oscillated to reciprocate said slide to and fro, a cam shaft, a cam on said shaft adapted to co-operate with said lever to oscillate the same, gripping means carried by said slide and disposed at either side of said bar, means adapted to engage one of said gripping means with said bar at the end of the rearward reciprocation of the slide and to disengage the same from the bar at the end of the forward reciprocation of the slide, and cam means carried by said camshaft and adapted to actuate said last named means.

16. In a machine of the character described, means adapted to intermittently feed a plurality of parallel bars or the like in spaced relation, said bars having spaced and aligned portions for receiving wires or the like, means adapted to intermittently feed wires or the like into relation with said spaced receiving portions of the bars and means for intermittently feeding the bars in the intervals between the feeding of said wires or the like and comprising a plurality of reciprocatory slides, levers adapted to be oscillated to reciprocate said slides to and fro, a cam shaft and a plurality of cams on said shaft adapted to co-operate with said levers to oscillate the same, gripping means carried by said slides and disposed at either side of said bars, means adapted to cause the gripping means to engage said bars at the end of the rearward reciprocation of the slides and to disengage the same from the bars at the end of the forward reciprocation of the slides, and cam means carried by said cam shaft adapted to actuate said last named means.

17. In a machine of the character described, means adapted to intermittently feed a bar or the like, means for perforating said bar in the intervals between the intermittent feed thereof comprising a stationary die disposed at one side of the bar, a punch disposed at the other side of the bar and adapted to be moved transversely thereof to co-operate with the die and perforate the bar, means adapted to operate the punch in the intervals between the intermittent feed of the bar, and means adapted to intermittently thread wires or the like through said perforations in the intervals between the intermittent feed of the bar.

18. In a machine of the character described, means adapted to intermittently feed a bar or the like, means for perforating said bar in the intervals between the intermittent feed thereof comprising a stationary die disposed at one side of the bar, a punch disposed at the other side of the bar and adapted to co-operate with the die to perforate the bar, a transversely reciprocating slide carrying the punch, and means for reciprocating the slide in the intervals between the intermittent feed of the bar comprising a vertically reciprocating member having a beveled surface adapted to co-operate with the slide to reciprocate the same to and fro during the to and fro movement of said member, and means adapted to intermittently feed wires or the like through said perforations in the intervals between the intermittent feed of the bar.

19. In a machine of the character described, means adapted to intermittently feed a bar or the like, means for perforating the bar in the intervals between the intermittent feed, and comprising a stationary die disposed at one side of the bar, a punch adapted to co-operate with the die to perforate the bar, a transversely reciprocating slide carrying a punch and provided intermediate its ends with a vertical slot having an inclined wall, a vertically reciprocating member having an inclined portion engaged with said slot and adapted to co-operate with the inclined wall thereof to reciprocate the slide transversely of the bar through the vertical reciprocatory movement of said member.

20. In a machine of the character described, means adapted to intermittently feed a bar or the like, means for perforating the bar in the intervals between the intermittent feed, and comprising a stationary die disposed at one side of the bar, a punch adapted to co-operate with the die to perforate the bar, a transversely reciprocating slide carrying a punch and provided intermediate its ends with a vertical slot having an inclined wall provided with a T-slot, a vertically reciprocating member having an inclined portion engaged with said slot and carrying a key engaged with said T-slot and adapted to co-operate with the inclined wall thereof to reciprocate the slide transversely of the bar through the reciprocatory movement of said member.

21. In a machine of the character described, means adapted to intermittently feed a plurality of parallel bars or the like longitudinally of the machine, means for perforating the bars in the intervals between the intermittent feed and comprising a plurality of aligned stationary dies each singly disposed at one side of each of said bars said dies aligned with each other transversely of the machine, a plurality of punches adapted to co-operate with said dies to perforate the bars, a cam shaft disposed transversely of the line of feed of said bars and a plurality of cam means carried by said shaft and adapted to operate said punches.

22. In a machine of the character described, means adapted to intermittently feed a bar or the like, means adapted to produce spaced perforations therein, means for threading a wire endwise through said perforations in the intervals between the intermittent feed of the bar, means for automatically stopping the feed of said wire after a predetermined period, and means for cutting off a length of the wire after the feeding thereof.

23. In a machine of the character described, means adapted to intermittently feed a bar or the like, means adapted to produce spaced wire receiving portions for receiving wires or the like transversely therethrough, means adapted to intermittently feed said wires or the like into relation with said spaced receiving portions of the bar in the intervals between the intermittent feed of the bar, means for automatically stopping the feed of said wire after a predetermined period, means adapted to automatically vary said period for the successive individual wires to produce wires of varying lengths and means for cutting off a length of wire after the feeding thereof.

24. In a machine of the character described, means adapted to intermittently feed two or more bars or the like having spaced perforations for receiving wires or the like transversely therethrough, dowell pins to engage said perforations and to insure their registration, and means adapted for successively feeding wires therethrough.

25. In a machine of the character described, means adapted to intermittently feed a bar or the like having spaced portions for receiving wires or the like transversely therethrough, means adapted to intermittently feed said wires or the like into relation with said spaced receiving portions of the bar in the intervals between the intermittent feed of the bar, a contact member adapted to be engaged by the end of the wire, means actuated by said contact member adapted to stop the feed of the wire, and means for cutting off a length of wire after the feeding thereof.

26. In a machine of the character described, means adapted to intermittently feed a bar or the like having spaced portions for receiving the wires or the like transversely therethrough, means adapted to intermittently feed said wires or the like into relation with said spaced receiving portions of the bar in the intervals between the intermittent feed of the bar, a contact member adapted to be engaged by the end of the wire, means actuated by said contact member that stops the feed of the wire, said contact member adapted to be shifted to vary the length of wire fed, and means for cutting off a length of wire after the feeding thereof.

27. In a machine of the character described, means adapted to intermittently feed a bar or the like having spaced portions for receiving wires or the like transversely therethrough, means adapted to intermittently feed said wires or the like into relation with said spaced receiving portions of the bar, in the intervals between the intermittent feed of the bar, contact member adapted to be engaged by the end of the wire, means actuated by said contact member adapted to stop the feed of the wire, means adapted to automatically shift said contact member to determine the length of the wire fed, and means for cutting off a length of wire after feeding thereof.

28. In a machine of the character described, means adapted to intermittently feed a bar or the like having spaced portions for receiving wires or the like transversely therethrough, means adapted to intermittently feed said wires or the like into relation with said spaced receiving portions of the bar in the intervals between the intermittent feed of the bar, means actuated by said contact member adapted to stop the feed of the wire, means for automatically shifting the contact member after each feeding of the wire to successively vary the length of wire fed and means for cutting off a length of wire after the feeding thereof.

29. In a machine of the character described, means adapted to intermittently feed a bar or the like having spaced portions for receiving wires or the like transversely therethrough, means adapted to intermittently feed said wires or the like in relation with said receiving portions of the bar in the intervals between the intermittent feed of the bar, a contact member adapted to be engaged by the end of the wire, means actuated by said contact member adapted to stop the feed of the wire, a cam adapted to shift the position of said contact member to vary the length of the wire fed, and means for cutting off a length of wire after the feeding thereof.

30. In a machine of the character described, means adapted to intermittently feed a bar or the like having spaced portions for receiving wires or the like transversely therethrough, means adapted to intermittently feed said wires or the like into relation with said spaced receiving portions of the bar in the intervals between the intermittent feed of the bar, a contact member adapted to be engaged by the end of the wire, means actuated by said contact member adapted to stop the feed of the wire, means for cutting off a length of bar after a predetermined number of wires have been fed therethrough, a cam for positioning said contact member to determine the length of the wire fed, means for rotating said cam through a single revolution between each cutting off operation upon said bar and means for cutting off a length of wire after the feeding thereof.

31. In a machine of the character described, means adapted to intermittently feed a bar or the like having spaced portions for receiving wires or the like transversely therethrough, means adapted to intermittently feed said wires or the like into relation with said receiving bar in the intervals between the intermittent feed of the bar, means for cutting off a length of the bar after a predetermined number of wires have been fed therethrough, and means for determining the lengths of the individual wires comprising a member having a contour corresponding substantially to the plan of the finished bar and wire structure, means for rotating said member through a single revolution in the interval between each cutting-off operation upon said bar, and means for cutting off a length of wire after the feeding thereof.

32. In a machine of the character described, means adapted to intermittently feed a bar or the like having spaced portions for receiving wires or the like transversely therethrough, means adapted to intermittently feed said wires or the like into relation with said spaced receiving portions of the bar in the intervals between the intermittent feed of the bar, a contact member adapted to be engaged by the end of the wire, electrical means actuated by said contact member adapted to stop the feed of the wire, and means for cutting off a length of wire after the feeding thereof.

33. In a machine of the character described, means adapted to intermittently feed a bar or the like having spaced portions for receiving wires or the like transversely therethrough, means adapted to intermittently feed said wires or the like into relation with said spaced receiving portions of the bar in the intervals between the intermittent feed of the bar, a solenoid adapted to be actuated to stop the feed of the wire, a contact member adapted to be engaged by the end of the wire, to close the circuit of said solenoid to stop the feed of the wire, and means for cutting off a length of wire after the feeding thereof.

34. In a machine of the character described, means adapted to intermittently feed a bar or the like, means adapted to produce spaced wire receiving portions for receiving wires or the like transversely therethrough, means adapted to intermittently feed said wires or the like intermittently and endwise into relation with said spaced receiving portions of the bar in the intervals between the intermittent feed of the bar, means for automatically stopping the feed of said wire after a predetermined period, and wire cutting off means adapted to be engaged with the wire after the feeding thereof.

35. In a machine of the character described, means adapted to intermittently feed a bar or the like, means adapted to produce spaced wire receiving portions for receiving wires or the like transversely therethrough, means adapted to feed said wires or the like intermittently and endwise and into relation with said spaced receiving portions of the bar in the intervals between the intermittent feed of the bar, wire cutting-off means and a cam adapted to actuate said wire cutting off means after the feeding of the wire.

36. In a machine of the character described, means adapted to intermittently feed a bar or the like having spaced portions for receiving wires or the like transversely therethrough, means adapted to intermittently feed said wires or the like into relation with said spaced receiving portions of the bar in the intervals between the intermittent feed of the bar, a rotatable cutter holder having a central aperture through which said wire is fed, a cutter blade slidably mounted upon said holder, and means actuated after the feed of the wire for moving said cutting blade into relation with the wire to cut off a length of the wire by a turning cut.

37. In a machine of the character described, means adapted to intermittently feed a bar or the like having spaced portions for receiving wires or the like transversely therethrough, means adapted to intermittently feed said wires or the like into relation with said spaced receiving portions of the bar in the interval between the intermittent feed of the bar, a rotatable cutter holder having a central aperture through which the wire is fed, a cutter blade slidably mounted upon said holder and normally held out of engagement with said wire by centrifugal force, and means adapted to move said cutter blade into engagement with said wire to cut off a length of the wire after the feeding thereof.

38. In a machine of the character described, means adapted to intermittently feed a bar or the like having spaced portions for receiving wires or the like transversely therethrough, means adapted to intermittently feed said wires or the like into relation with said spaced receiving portions of the bar in the intervals between the intermittent feed of the cutter, a rotatable cutting blade, means adapted to move said cutter blade into engagement with the wire to cut off a length thereof after the feeding of the same, said cutter blade having a beveled edge whereby the end of the next wire to be fed is pointed conically.

39. In a machine of the character described, means adapted to intermittently feed a bar or the like having spaced portions for receiving wires or the like transversely therethrough, means adapted to intermittently feed wires or the like into relation with said spaced receiving portions of the bar, and comprising a pair of feed rollers disposed at each side of the wire, means for continuously rotating said rollers, and means for moving one of said rollers into and out of gripping relation with the wire whereby the wire is fed while the roller is in gripping relation and is stationary when said roller is moved out of gripping relation.

40. In a machine of the character described, means adapted to intermittently feed a bar or the like having spaced perforations therein, means for feeding the wire through said perforations in the intervals between the intermittent feed of the bar, means adapted to be engaged by the end of said wire after the same has been fed a predetermined distance, said means adapted through contact of the wire therewith to cause stoppage of the feed of the wire, and means for cutting off the wire after the feeding thereof.

41. In a machine of the character described, means adapted to intermittently feed a bar or the like having spaced perforations, means for feeding a wire through said perforations, in the intervals between the intermittent feed of the bar comprising a pair of rotatable gripping rollers adapted to engage the bar to feed the same, means actuated through engagement of the wire therewith adapted to automatically cause disengagement of said rollers to stop the feeding thereof, and means for cutting off the wire after the feeding thereof.

42. In a machine of the character described, means adapted to intermittently feed a bar or the like having spaced portions for receiving wires or the like transversely therethrough, means adapted to intermittently feed wires or the like into relation with said spaced receiving portions of the bar in the intervals between the intermittent feed of the bar, and means for clinching said spaced receiving portions with relation to the wires to prevent transverse displacement of the wires, comprising co-operative means above and below the bar adapted to compress said spaced receiving portions of the bar in the intervals between the intermittent feed of the bar.

43. In a machine of the character described, means adapted to intermittently feed a bar or the like having spaced portions for receiving wires or the like transversely therethrough, means adapted to intermittently feed wires or the like into relation with said spaced receiving portions of the bar in the intervals between the intermittent feed of the bar, and means adapted to intermittently secure said spaced receiving portions with relation to said wires to prevent transverse displacement of the wires.

44. In a machine of the character described, means adapted to intermittently feed a bar or the like having spaced portions for receiving wires or the like transversely therethrough, means adapted to intermittently feed wires or the like into relation with said receiving portions of the bar in the intervals between the intermittent feed of the bar, means adapted to permanently secure said spaced receiving portions with relation to the wires to prevent transverse displacement of the wires, and comprising stationary anvil member disposed at one side of said bar and having a groove in alignment with the longitudinal feed of said bar and through which said bar is fed, and a movable pressure member at the other side of said bar adapted to intermittently compress said bar against said anvil member to clinch said spaced receiving portions.

45. In a machine of the character described, means adapted to intermittently feed a plurality of spaced parallel bars or the like having spaced portions for receiving wires or the like transversely therethrough, said feeding means for the respective bars being relatively adjustable transversely, means adapted to intermittently feed wires or the like into relation with said spaced receiving portions of the bars in the intervals between the intermittent feed of the bars, means adapted to permanently secure said spaced receiving portions with relation to said wires to prevent transverse displacement of the wires and comprising a plurality of anvil members disposed at one side of said bar and adjustable transversely in correspondence with the transverse adjustment of said feeding means, a pressure bar disposed at the other side of said bars, and extending in opposed relation to said plurality of anvil members, and means for intermittently reciprocating said pressure bar to compress said spaced receiving portions of the bars between the same and said anvils to clinch said portions.

46. In a machine of the character described, means adapted to intermittently feed a bar or the like having spaced portions for receiving wires or the like transversely therethrough, means adapted to intermittently feed said wires or the like into relation with said spaced receiving portions of the bar in the intervals between the feed of the bar, and means for clinching the spaced receiving portions of the bar to prevent transverse displacement of the wires, comprising a stationary member at one side of the bar and a pressure member at the other side of the bar adapted to be intermittently engaged with the bar in the intervals between the intermittent feed of the bar to compress said spaced receiving portions.

47. In a machine of the character described, means adapted to intermittently feed a bar or the like having spaced portions for receiving wires or the like transversely therethrough, means adapted to intermittently feed wires or the like into relation with said spaced receiving portions of the bar in the intervals between the feed of the bar, and means for clinching said spaced receiving portions of the bar to prevent transverse displacement of the wires, comprising a stationary member at one side of the bar and a pressure member at the other side thereof, and cam means adapted to intermittently move said pressure member toward said stationary member in the intervals between the intermittent feed of the bar to compress said wire receiving portions.

48. In a machine of the character described, means adapted to intermittently feed a bar or the like having spaced perforations for receiving wires or the like transversely therethrough, means adapted to intermittently thread wires or the like through said perforations of the bar in the intervals between the intermittent feed of the bar, and means adapted to compress said perforated portions of the bar to permanently secure said wires against transverse displacement.

49. In a machine of the character described, means adapted to intermittently feed a plurality of spaced bars or the like having spaced portions in alignment for intermittently receiving wires or the like transversely therethrough, means for feeding said wires or the like into relation with said spaced portions in the intervals between the intermittent feed of the bar, and means for clinching said spaced receiving portions to prevent transverse displacement of the wires, comprising transversely adjustable stationary means engaged at the upper sides of the respective bars, and a pressure member extending transversely at the other side of said bars and adapted to intermittently co-operate with the said stationary means in the intervals between the intermittent feed of the bars to compress said spaced receiving portions of the bar.

50. In a machine of the character described, means for intermittently feeding a bar or the like having spaced portions for receiving wires or the like transversely therethrough, means adapted to intermittently feed said wires or the like into relation with said spaced receiving portions of the bar in the intervals between the intermittent feed of the bar to provide said wires in parallel spaced relation transversely of said bar, means for imparting a lateral bend to said wires, and comprising a pair of co-operating bent dies, means for moving one of said dies relatively to the other in the intervals between the intermittent feed of the bar, and means for raising and lowering said dies to bring the same into and out of relation with said wires in the intervals between the intermittent feed of said bar and whereby the dies are operative to bend the wires when brought into relation therewith and inoperative when brought out of relation therewith.

51. In a machine of the character described, means for intermittently feeding a bar or the like having spaced portions for receiving wires or the like transversely therethrough, means adapted to intermittently thread wires or the like into relation with said spaced receiving portions of the bar in the intervals between the intermittent feed of the bar to provide said bars in spaced parallel relation transversely of the bar, and means for imparting a lateral bend to said wires and comprising a pair of co-operating bending dies and means for moving said dies into lateral relation with said wires at each side of one of said wires in the intervals between the feeding of said bar, and means for actuating said dies to bend the wire.

52. In a machine of the character described, means for intermittently feeding a bar or the like having spaced portions for receiving wires or the like transversely therethrough, means adapted to intermittently feed said wires or the like into relation with said spaced receiving portions of the bar in the intervals between the intermittent feed of the bar to provide said wires in spaced parallel relation transversely of the bar, and means for imparting a lateral bend to said wires comprising a bar normally out of relation with said wires, means for operating of said dies in the intervals between the feeding periods of the bar, and means adapted at predetermined periods to move said dies into relation to bend said wires in the intervals between the feed of the bar.

53. In a machine of the character described, means for intermittently feeding a bar or the like having spaced portions for receiving wires or the like transversely therethrough, means adapted to intermittently feed said wires or the like into relation with said spaced receiving portions of the bar in the intervals between the intermittent feed of the bar to provide said wires in spaced parallel relation transversely of the bar, and means for imparting a lateral bend to said wire, comprising a rockable support disposed to one side of said wires, a pair of co-operating dies, bending dies carried by said support normally out of relation with said wires, means for operating said dies to bend the wires, and means for moving said rockable support at predetermined points and in the intervals between the feed of said bar to move said co-operating dies into relation with said wires.

54. In a machine of the character described, means for intermittently feeding a bar or the like having spaced portions for receiving wires or the like transversely therethrough, means adapted to intermittently feed said wires or the like into relation with said spaced receiving portions of the bar in the intervals between the intermittent feed of the bar to provide said wires in spaced parallel relation transversely of the bar, and means for imparting a lateral bend to certain of said wires, comprising a movable support disposed at one side of said wires, co-operative bending dies carried by said support and normally out of relation with said wires, operating means for said support adapted to move said support to bring said dies into relation with said wires, means for actuating said operating means during each interval between the intermittent feed of the bar, and means for operatively connecting said operating means to said support at predetermined points whereby said support is moved to bring said dies into operative relation with certain wires.

55. In a machine of the character described, means for intermittently feeding a bar or the like having spaced portions for receiving wires or the like transversely therethrough means adapted to intermittently feed said wires or the like into relation with said spaced receiving portions of the bar in the intervals between the intermittent feed of the bar to provide said wires in parallel spaced relation transversely of said bar, and means for imparting a lateral bend to said wires, and comprising a movable support, a pair of co-operating bending dies carried by said support and normally out of relation with said wires, means for moving said support into co-operative relation with said wires in the intervals between the intermittent feed of the bar, a solenoid adapted to operatively connect said support and said moving means therefor, and means for energizing said solenoid at predetermined periods to bring said support into co-operative relation with predetermined wires.

56. In a machine of the character described, means for intermittently feeding a bar or the like, having spaced portions for receiving wires or the like transversely therethrough, means adapted to intermittently feed said wires or the like into relation with said spaced receiving portions of the bar in the intervals between the intermittent feed of the bar to provide said wires in spaced parallel relation transversely of the bar, and means for imparting a plurality of lateral bends of different configuration to said wires and comprising a plurality of movable supports disposed at one side of said wires, bending dies carried by said supports normally out of co-operative relation with said wires, means for operating said bending dies, operating means for said supports, and means for operatively relating either of said supports with said controlling means at predetermined points whereby either of said supports is moved into relation with predetermined wires.

57. In a machine of the characters described, means adapted to intermittently feed a bar or the like having spaced portions for receiving wires or the like transversely therethrough, means adapted to intermittently feed said wires or the like into relation with said spaced receiving portions of the bar in the intervals between the feed of the bar and means for imparting a vertical bend to said wires in the interval between the intermittent feed of the bar, and comprising a pair of co-operating dies disposed above and below said wires and adapted to be intermittently operated to bend the wires in the interval between the intermittent feed of the bar.

58. In a machine of the character described, means adapted to intermittently feed a bar or the like having spaced portions for receiving wires or the like transversely therethrough, means adapted to intermittently feed said wires or the like into relation with said spaced receiving portions of the bar in the intervals between the intermittent feed of the bar, and means for imparting a vertical bend to said wires in the intervals between the intermittent feed of the bar, and comprising a stationary die disposed at one side of the wires and a movable die disposed at the other side of the wires and adapted to be moved into and out of relation with said stationary die to bend the wires in the intervals between the intermittent feed of the bar.

59. In a machine of the character described, means adapted to intermittently feed a bar or the like having spaced portions for receiving wires or the like transversely therethrough, means adapted to intermittently feed said wires or the like into relation with said spaced receiving portions of the bar in the intervals between the feed of the bar, and means for simultaneously imparting longitudinally off-set vertical bends to two of said wires in the interval between the intermittent feed of the bar, and comprising a pair of longitudinally off-set stationary dies at one side of said wires adapted to co-operate with two of said wires, and a pair of longitudinally off-set movable dies on the other side of said wires in opposed relation to said stationary dies, and means for intermittently reciprocating said movable dies to bend the wires in the intervals between the intermittent feed of the bar.

60. In a machine of the character described, means adapted to intermittently feed a bar or the like having spaced portions for receiving wire or the like transversely therethrough, means adapted to intermittently feed said wires or the like into relation with said spaced receiving portions of the bar, and means for imparting a vertical bend to said wires in the intervals between the intermittent feed of the bar, and comprising a stationary die at one side of the wires, a movable die at the other side of the wires having a wire engaging groove transversely of the line of feed of said bar, means for intermittently moving said die into relation with said stationary die to bend the wires in the intervals between the intermittent feed of the bar.

61. In a machine of the character described, means adapted to intermittently feed a bar or the like having spaced portions for receiving wires or the like transversely thereof, means adapted to intermittently feed said wires or the like into relation with said spaced receiving portions of the bar in the intervals between the intermittent feed of the bar, and means for inserting a relatively short length of bar having spaced wire receiving portions and in parallel relation to said first bar, comprising a member adapted to receive said short length of wire with the end wire receiving portion thereof out of alignment with the wire feeding means, said means adapted to be moved to a position with said end wire receiving portion in alignment with said wire feeding means and with the wire receiving portion of said first bar whereby the wire is fed through said wire receiving portion of said short bar in the interval between the intermittent feed of the first bar.

62. In a machine of the character described, means adapted to intermittently feed a bar or the like having spaced portions for receiving wires or the like transversely therethrough, means adapted to intermittently feed said wires or the like into relation with said spaced receiving portions of the bar in the intervals between the intermittent feed of the bar, and means for inserting a relatively short length of bar having spaced wire receiving portions, and comprising a member adapted to be moved into and out of operative position and having positioning means for said short length of bar, and automatic means for moving said member into operative position at predetermined points to position the wire receiving portions of the short length of bar in alignment with the wire feeding means.

63. In a machine of the character described, means adapted to intermittently feed a bar or the like having spaced portions for receiving wires or the like transversely therethrough, means adapted to intermittently feed said wires or the like into relation with said spaced receiving portions of the bar, in the intervals between the intermittent feed of the bar, and means for inserting a relatively short length of bar having spaced wire receiving portions, and comprising a member adapted to be moved into and out of operative position and having a guide slot for said short length of bar, and automatic means for moving said member into operative position at predetermined points to position the wire receiving portions of the short lengths of bar in alignment with the wire feeding means.

64. In a machine of the character described, means adapted to intermittently feed a bar or the like having spaced portions for receiving wires or the like transversely therethrough, means adapted to intermittently feed a bar or the like having spaced portions for receiving wires or the like transversely thereof, means adapted to intermittently feed said wires or the like into relation with said spaced receiving portions of the bar in the intervals between the intermittent feed of the bar, and means for inserting a plurality of relative short lengths of bars having transversely aligned spaced wire receiving portions, and comprising a member adapted to be moved into and out of operative position and having a plurality of guide slots adapted to receive said short length of bar, and means for moving said member into operative position whereby said wire receiving portions are aligned with the wire feeding means.

65. In a machine of the character described, means adapted to intermittently feed a bar or the like having spaced portions for receiving wires or the like transversely thereof, means adapted to intermittently feed said wires or the like into relation with said spaced receiving portions of the bar in the intervals between the intermittent feed of the bar, and means for successively inserting a plurality of short lengths of bars of different lengths and having spaced wire receiving portions, comprising a member adapted to be moved into and out of operative position and having a slot adapted to receive the longer of said short lengths of bar, abutment means adapted to be moved into and out of abutting relation in said slot, the shorter of said short lengths of bar adapted to be inserted in said slot with said abutment means inserted in the slot, and means for moving said member into operative position to bring said wire receiving portions of said short lengths of bars into alignment with the wire feeding means.

66. In a machine of the character described, means adapted to intermittently feed a bar or the like having spaced portions for receiving wires or the like transversely thereof, means adapted to intermittently feed said wires or the like into relation with said spaced receiving portions of the bar in the intervals between the intermittent feed of the bar, and means for inserting a perforated member, comprising a member adapted to be moved into and out of operative position and having means to receive said perforated member, said member adapted to be moved into operative position to bring the perforation of said member into alignment with said wire feeding means.

67. In a machine of the character described, means adapted to intermittently feed a bar or the like having spaced portions for receiving wires or the like transversely thereof, means adapted to intermittently feed said wires or the like into relation with said spaced receiving portions of the bar in the intervals between the intermittent feed of the bar, and means for inserting a coiled spring comprising a member adapted to be moved into and out of operative position and having a recess for receiving said coil spring, said member adapted to be moved into operative position to bring the opening through said coil spring into alignment with said wire feeding means.

68. In a machine of the character described, means adapted to intermittently feed a bar or the like having spaced portions for receiving wires or the like transversely thereof, means adapted to intermittently feed said wires or the like into relation with said spaced receiving portions of the bar in the intervals between the intermittent feed of the bar, and means for inserting a coil spring comprising a member adapted to be moved into and out of operative position and having a recess adapted to receive said coil spring, a resilient retainer adapted to yieldably hold said spring in said recess, said member adapted to be moved into operative position to bring the opening of said spring into alignment with the wire feeding means, said spring adapted to be moved from said recess upon the insertion therethrough of a wire and the successive feed of the bar.

69. In a machine of the character described, means adapted to intermittently feed a bar or the like having spaced portions for receiving wires or the like transversely thereof, means adapted to intermittently feed said wires or the like into relation with said spaced receiving portions of the bar in the intervals between the intermittent feed of the bar, and means for inserting a member having a wire receiving portion and comprising a member adapted to be moved into and out of operative position and having means for receiving said member, and a solenoid adapted to be actuated at a predetermined point to cause said member to be moved into operative position to bring the wire receiving portion of said member into alignment with said wire feeding means.

70. In a machine of the character described, means adapted to intermittently feed a bar or the like having spaced portions for receiving wires or the like transversely thereof, means adapted to intermittently feed said wires or the like into relation with said spaced receiving portions of the bar in the intervals between the intermittent feed of the bar, and means for inserting a member having a wire receiving portion, and comprising a movable member adapted to be moved into and out of operative position and having means for receiving said member, means for cutting off a length of said bar and including a rotatable member adapted to make a single revolution between the successive cutting-off operation upon said bar, and having means operative at the end of said single revolution to operate said bar cutting-off means, and means carried by said rotatable member and operable at a predetermined point to cause said movable member to be moved into operative position to bring the wire receiving portion of said member into alignment with said wire feeding means.

71. In a machine of the character described, means adapted to intermittently feed a bar or the like having spaced portions for receiving wires or the like transversely thereof, means adapted to intermittently feed said wires or the like into relation with said spaced receiving portions of the bar in the intervals between the intermittent feed of the bar and means for inserting a relatively short length of bar having spaced wire receiving portions and in parallel relation to said first bar and comprising a member adapted to receive said short length of bar with the end spaced receiving portion thereof out of alignment with the wire feeding means, said means adapted to be moved to a position with said end wire receiving portion in alignment with said wire feeding means and with the wire receiving portion of said first bar, whereby the wire is fed through the wire receiving portion of said short bar in the interval between the intermittent feed of the first bar.

72. In a machine of the character described, means adapted to intermittently feed a bar or the like having spaced portions for receiving wires or the like transversely thereof, means adapted to intermittently feed said wires or the like into relation with said spaced receiving portions of the bar in the intervals between the intermittent feed of the bar and means for inserting a relatively short length of bar having spaced wire receiving portions and in parallel relation to said first bar and comprising a member adapted to receive said short length of bar with the end spaced receiving portion thereof out of alignment with the wire feeding means, and means for automatically moving said member at a predetermined point to bring the end wire receiving portion thereof into alignment with the wire feeding means and with the wire receiving portion of said first bar, said means adapted to be moved to a position with said end wire receiving portion in alignment with said wire feeding means and with the wire receiving portion of said first bar, whereby the wire is fed through the wire receiving portion of said short bar in the interval between the intermittent feed of the first bar.

73. In a machine of the character described, means adapted to intermittently feed a bar or the like having spaced portions for receiving wires or the like transversely thereof, means adapted to intermittently feed said wires or the like into relation with said spaced receiving portions of the bar in the intervals between the intermittent feed of the bar, means for inserting a relatively short bar in parallel relation to said first bar and having spaced wire receiving portions, said means comprising a member hinged at one end and adapted to receive said relatively short bar with the end wire receiving portion thereof at the swinging end of said member, means for supporting said hinged member in raised position with said end wire receiving portion out of alignment with the wire feeding means, and means for automatically releasing said supporting means at a predetermined point to permit said hinged member to move to its lower position with said end wire receiving portion in alignment with the wire feeding means, and whereby the wire is engaged with said wire receiving portion in the interval between the intermittent feed of the bar.

74. In a machine of the character described, means adapted to intermittently feed a bar or the like having spaced portions for receiving wires or the like transversely therethrough, means adapted to intermittently feed said wires or the like into relation with said spaced receiving portions of the bar in the intervals between the intermittent feed of the bar, and auxiliary feed means adapted to be intermittently engaged with the transverse wires to draw the bar through the machine.

75. In a machine of the character described, means adapted to intermittently feed wires or the like into transverse relation with a bar or the like having spaced wire receiving portions, means at one side of said wire feeding means adapted to intermittently push said bar in the intervals between the intermittent feed of the wires, and means at the other side of said wire feeding means adapted to intermittently pull said bar in the intervals between the intermittent feed of said wire.

76. In a machine of the character described, means adapted to intermittently feed wires or the like into transverse relation with a bar or the like having spaced wire receiving portions, gripping means at one side of said wire feeding means having to and fro movement and adapted to intermittently grip the bar to push it in the intervals between the intermittent feed of the wires, and means at the other side of the wire feeding means having to and fro movement and adapted to be intermittently engaged with the transverse wires to pull the bar in the intervals between the intermittent feed of said wires.

77. In a machine of the character described, means adapted to intermittently feed a bar or the like having spaced portions for receiving wires or the like transversely therethrough, means adapted to intermittently feed said wires or the like into relation with said spaced receiving portions of the bar in the intervals between the intermittent feed of the bar, means for inserting a relatively short length of bar having a wire receiving portion and comprising a member adapted to position said short length of bar with its wires receiving portion in alignment with said wire feeding means, and auxiliary feed means disposed contiguous to said member and adapted to be operated in synchronism with said bar feeding means to feed said short length of bar.

78. In a machine of the character described, means adapted to intermittently feed a bar or the like having spaced portions for receiving wires or the like transversely therethrough, means adapted to intermittently feed said wires or the like into relation with said spaced receiving portions of the bar in the intervals between the intermittent feed of the bar, means for inserting a relatively short length of bar having a wire receiving portion and comprising a member adapted to position said short length of bar with its wire receiving portion in alignment with said wire feeding means, and auxiliary feed means disposed contiguous to said member and adapted to be operated in synchronism with said bar feeding means, said auxiliary feed means adapted to be engaged with the transverse wires to feed said other length of bar.

79. In a machine of the character described, means adapted to intermittently feed a bar or the like having spaced portions for receiving wires or the like transversely thereof, means adapted to intermittently feed said wires or the like into relation with said spaced receiving portion of the bar in the intervals between the intermittent feed of the bar, and means for cutting off a length of said bar at the end of a predetermined period.

80. In a machine of the character described means adapted to intermittently feed a bar or the like having spaced portions for receiving wires or the like transversely thereof, means adapted to intermittently feed said wires or the like into relation with said spaced receiving portions of the bar in the intervals between the intermittent feed of the bar, and means for cutting off a length of said bar at the end of a predetermined period and including a rotatable member having means operative at the end of a predetermined period to actuate said bar cutting off means.

81. In a machine of the character described, means adapted to intermittently feed a bar or the like having spaced portions for receiving wires or the like transversely thereof, means adapted to intermittently feed said wires or the like into relation with said spaced receiving portions of the bar in the intervals between the intermittent feed of the bar, and means for cutting off a length of said bar at the end of a predetermined period and including a rotatable member adapted to make a single revolution between the successive cutting off operations upon the bar, and having means operative at the end of said single revolution to actuate said bar cutting off means.

82. In a machine of the character described, means adapted to intermittently feed a bar or the like having spaced portions for receiving wires or the like transversely thereof, means adapted to intermittently feed said wires or the like into relation with said spaced receiving portions of the bar in the intervals between the intermittent feed of the bar, means for cutting off a length of said bar, a solenoid for operating said cutting off means, and means for actuating said solenoid at the end of a predetermined period.

83. In a machine of the character described, means adapted to intermittently feed a bar or the like having spaced portions for receiving wires or the like transversely thereof, means adapted to intermittently feed said wires or the like into relation with said spaced receiving portions of the bar in the intervals between the intermittent feed of the bar, means for cutting off a length of said bar, a solenoid for actuating said cutting off means, a rotatable means and contact means carried thereby adapted to actuate said solenoid at the end of a predetermined period.

84. In a machine of the character described, means adapted to intermittently feed a bar or the like having spaced portions for receiving wires or the like transversely thereof, means adapted to intermittently feed said wires or the like into relation with said spaced receiving portions of the bar in the intervals between the intermittent feed of the bar, means for cutting off a length of said bar, a solenoid for operating said cutting off means, a rotatable member adapted to make a single revolution between the successive cutting off operations upon the bar and contact means carried thereby and adapted to actuate said solenoid at the end of said single revolution.

85. In a machine of the character described, means adapted to feed a bar or the like having spaced portions for receiving wires or the like transversely thereof, means adapted to intermittently feed said wires or the like into relation with said spaced receiving portions of the bar in the intervals between the intermittent feed of the bar, means for cutting off a length of bar and comprising co-operative cutting means adapted to be moved into cutting relation with the bar in the intervals between the intermittent feed of the bar, and means for operating said cutting means when in such cutting relation.

86. In a machine of the character described, means adapted to feed a bar or the like having spaced portions for receiving wires or the like transversely thereof, means adapted to intermittently feed said wires or the like into relation with said spaced receiving portions of the bar in the intervals between the intermittent feed of the bar, means for cutting off a length of bar and comprising a pair of co-operative scissor-like members adapted to be moved into cutting relation with the bar in the intervals between the intermittent feed of the bar and means for operating said cutting means when in such cutting relation.

87. In a machine of the character described, means adapted to feed a bar or the like having spaced portions for receiving wires or the like transversely thereof, means adapted to intermittently feed said wires or the like into relation with said spaced receiving portions of the bar in the intervals between the intermittent feed of the bar, means for cutting off a length of bar and comprising co-operative cutting means, a cam adapted to move said cutting means into cutting relation with the bar in the intervals between the intermittent feed of the bar, and means for operating said cutting means when in such cutting relation.

88. In a machine of the character described, means adapted to feed a bar or the like having spaced portions for receiving wires or the like transversely thereof, means adapted to intermittently feed said wires or the like into relation with said spaced receiving portions of the bar in the intervals between the intermittent feed of the bar, means for cutting off a length of bar and comprising a pair of co-operative scissor-like members, a cam having a peripheral surface adapted to move said cutting members into cutting relation with the bar in the intervals between the intermittent feed of the bar, and a cam portion adapted to oscillate one of said scissor-like members when in such cutting relation to cut the bar.

89. In a machine of the character described, means adapted to intermittently feed a bar or the like having spaced portions for receiving wires or the like transversely thereof, a rotary shaft for actuating said feeding means and adapted to make a single revolution during each feeding cycle of the bar, means adapted to intermittently feed said wires or the like into relation with said spaced receiving portions of the bar in the intervals between the intermittent feed of the bar, means for cutting off a length of said bar and means for actuating said cutting-off means in the intervals between the intermittent feed of the bar and including a rotary member, and a clutch adapted to be operated at a predetermined point to connect said rotary member to said rotary shaft during a single revolution thereof.

90. In a machine of the character described, means adapted to intermittently feed a bar or the like having spaced portions for receiving wires or the like transversely thereof, a rotary shaft for actuating said feeding means and adapted to make a single revolution during each feeding cycle of the bar, means adapted to intermittently feed said wires or the like into relation with said spaced receiving portions of the bar, means for cutting off a length of said bar and means for actuating said cutting-off means in the intervals between the intermittent feed of the bar and including a rotary member, a clutch for connecting said rotary member to said rotary shaft at a predetermined point, and means for automatically disconnecting said member at the end of a single revolution.

91. In a machine of the character described, means adapted to intermittently feed a bar or the like having spaced portions for receiving wires or the like transversely thereof, a rotary shaft for actuating said feeding means and adapted to make a single revolution during each feeding cycle of the bar, means adapted to intermittently feed said wires or the like into relation with said spaced receiving portions of the bar, means for cutting off a length of said bar and means for actuating said cutting-off means in the intervals between the intermittent feed of the bar and including a rotary member, a clutch for connecting said rotary member to said rotary shaft, a solenoid adapted to be operated at a predetermined point to operate said clutch, and means for automatically disconnecting said rotary member at the end of a single revolution.

92. In a machine of the character described, means adapted to intermittently feed a bar or the like having spaced portions for receiving wires or the like transversely thereof, a rotary shaft for actuating said feeding means and adapted to make a single revolution during each feeding cycle of the bar, means adapted to intermittently feed said wires or the like into relation with said spaced receiving portions of the bar, means for cutting off a length of said bar and means for actuating said cutting-off means in the intervals between the intermittent feed of the bar and including a rotary member, a clutch for connecting said rotary member to said rotary shaft, a solenoid adapted to be actuated to operate said clutch, a control member including a contact adapted to be operated at the end of a predetermined plurality of feeding cycles of said bar to actuate said solenoid, and means for automatically disconnecting said rotary member at the end of a single revolution.

93. In combination, means for feeding a bar or the like longitudinally, means for feeding transverse wires into relation with said bar, a drive shaft extending longitudinally of the machine, and means for performing a plurality of different shaping operations on said bar at spaced points in the machine and including a plurality of transversely disposed shafts geared to said drive shaft.

94. In combination, means for feeding a bar or the like longitudinally, means for feeding transverse wires or the like into relation with said bar, a drive shaft extending longitudinally of the machine, and means for performing a plurality of shaping operations on said wires and including a plurality of tranversely disposed shafts geared to said drive shaft.

95. In combination, means for feeding a plurality of spaced parallel bars or the like, said means being adjustable transversely of the line of feed of the bars and toward and away from each other to adjust the spacing of said bars, a drive shaft extending longitudinally of the machine, means for operating said feed means including a transversely disposed shaft geared to said drive shaft, and means for feeding transverse wires or the like into relation with said bars.

96. In combination, means for feeding a plurality of spaced parallel bars or the like, said means being adjustable transversely of the line of feed of the bar and toward and away from each other to adjust the spacing of the bars, other means for performing similar operations upon said several bars, said means being adjustable with said feed means, a drive shaft extending longitudinally of the machine, means for operating said feed means and said other means including a plurality of transversely disposed shafts geared to said drive shaft, and means for feeding wires or the like transversely into relation with said bars.

97. In combination, means for intermittently feeding a bar or the like longitudinally, means for feeding transverse wires or the like into relation with said bar in the intervals between the intermittent feed of the bar, a drive shaft, and means operated by said drive shaft for performing different shaping operations upon said bar and wires once during each feeding cycle.

98. In combination, means for intermittently feeding a bar or the like longitudinally, means for feeding transverse wires or the like into relation with said bar in the intervals between the intermittent feed of the bar, a drive shaft, means operated by said drive shaft for performing operations upon said bar during a feeding cycle but not during each cycle, and control means for controlling the operation of said last means during predetermined cycles.

99. In combination, means for intermittently feeding a bar or the like longitudinally, means for feeding transverse wires or the like into relation with said bar in the intervals between the intermittent feed of the bar, a drive shaft, means operated by said drive shaft for performing operations upon said wires during a feeding cycle, but not during each cycle, and electrical control means for controlling the operation of said last means during predetermined cycles.

100. In combination, means for intermittently feeding a bar or the like longitudinally, means for feeding transverse wires or the like into relation with said bar in the intervals between the intermittent feed of the bar, a drive shaft, means operated by said drive shaft to perform shaping operations upon said bar and wires once during each feeding cycle, other means operated by said drive shaft for performing other operations upon said bar and wires during a feeding cycle, but not during each cycle, and control means for operating said other means during predetermined cycles.

Signed at Bridgeport, in the county of Fairfield and State of Connecticut this 14th day of February, A. D., 1923.

JOSEPH H. BENTLEY.

Witnesses:
C. M. NEWMAN,
LILLIAN M. ALLING.